(12) United States Patent
Tsuda et al.

(10) Patent No.: US 9,303,758 B2
(45) Date of Patent: Apr. 5, 2016

(54) CONTROL DEVICE

(71) Applicant: AISIN AW Co., LTD., Anjo-shi, Aichi-ken (JP)

(72) Inventors: Kohei Tsuda, Nishio (JP); Tomohiro Onouchi, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 33 days.

(21) Appl. No.: 14/362,568

(22) PCT Filed: Feb. 22, 2013

(86) PCT No.: PCT/JP2013/054572
§ 371 (c)(1),
(2) Date: Jun. 3, 2014

(87) PCT Pub. No.: WO2013/125692
PCT Pub. Date: Aug. 29, 2013

(65) Prior Publication Data
US 2014/0365093 A1  Dec. 11, 2014

(30) Foreign Application Priority Data
Feb. 24, 2012  (JP) .................................. 2012-039401

(51) Int. Cl.
| | |
|---|---|
| *F16H 61/02* | (2006.01) |
| *F16H 63/50* | (2006.01) |
| *F16H 61/06* | (2006.01) |
| *B60W 10/02* | (2006.01) |
| *B60W 30/19* | (2012.01) |
| *B60W 10/115* | (2012.01) |
| *B60K 6/48* | (2007.10) |
| *B60W 10/10* | (2012.01) |
| *B60K 6/547* | (2007.10) |
| *B60W 20/00* | (2006.01) |

(52) U.S. Cl.
CPC .............. *F16H 61/0213* (2013.01); *B60K 6/48* (2013.01); *B60K 6/547* (2013.01); *B60W 10/02* (2013.01); *B60W 10/10* (2013.01); *B60W 10/115* (2013.01); *B60W 20/00* (2013.01); *B60W 30/19* (2013.01); *F16H 61/06* (2013.01); *F16H 63/502* (2013.01); *B60Y 2300/429* (2013.01); *F16H 2061/0234* (2013.01); *Y02T 10/6221* (2013.01)

(58) Field of Classification Search
None
See application file for complete search history.

(56) References Cited

U.S. PATENT DOCUMENTS

| | | | |
|---|---|---|---|
| 5,961,421 | A | 10/1999 | Hoshiya et al. |
| 6,019,699 | A | 2/2000 | Hoshiya et al. |
| 2004/0116252 | A1 | 6/2004 | Iwamoto et al. |
| 2004/0144293 | A1 | 7/2004 | Tani et al. |

FOREIGN PATENT DOCUMENTS

| | | |
|---|---|---|
| JP | H05-71631 A | 3/1993 |
| JP | A-11-063191 | 3/1999 |
| JP | A-11-225403 | 8/1999 |
| JP | A-2004-144293 | 5/2004 |
| JP | A-2009-006735 | 1/2009 |
| JP | A-2009-103324 | 5/2009 |
| JP | 2010-007491 A | 1/2010 |
| JP | 2010-127359 A | 6/2010 |
| JP | A-2010-143364 | 7/2010 |
| JP | A-2011-214700 | 10/2011 |
| WO | WO 2010/143739 A1 | 12/2010 |

*Primary Examiner* — Ramya Burgess
*Assistant Examiner* — Timothy M Hannon
(74) *Attorney, Agent, or Firm* — Oliff PLC

(57) ABSTRACT

A control device configured to control a vehicle. When the required driving force is equal to or less than a control judgment value, the shift control section judges that an implementing condition of engagement limited downshift control is met, starts transition control to cause the release-side engagement device to transition to a non-direct-coupled engagement state and, after the release-side engagement device transitions to a non-direct-coupled engagement state, starts increasing rotation speed control to control rotation speed of the input member to be higher than synchronized rotation speed, starts differential rotation speed control to control the rotation speed to be higher than the synchronized rotation speed, and prohibits engagement of the engagement-side engagement device until it becomes higher than the synchronized rotation speed.

5 Claims, 12 Drawing Sheets

CONTROL DEVICE

TECHNICAL FIELD

The present invention relates to a control device for controlling a vehicle driving apparatus including an input member drive-coupled to a driving force source, an output member drive-coupled to wheels, and a speed change mechanism which changes rotation speed from the input member according to a speed ratio of a shift speed formed by releasing or engaging a plurality of engagement devices among a plurality of shift speeds having different speed ratios and transmits the changed rotation speed to the output member.

BACKGROUND ART

Regarding the control device as described above, for example, a technology described in Patent Document 1 listed below is already known. The technology described in Patent Document 1 is such that, in a state where a required driving force for wheels is low, a shift speed with a speed ratio larger than that of the current shift speed is determined as a target shift speed due to decrease in vehicle speed or the like and downshift control is started, and thereafter an engagement device on a release side is released and an engagement device on an engagement side is engaged, thereby making the speed change mechanism form the target shift speed.

However, in the technology of Patent Document, after the downshift control is started, rotation speed of the input member is increased to synchronized rotation speed after shifting, and an engagement pressure of the engagement-side engagement device is increased, so as to quickly cause the engagement-side engagement device to transition to a direct-coupled engagement state. Thus, torque transmitted to the wheel side can vary and cause a torque shock to occur, due to deviation of timing to increase the engagement pressure of the engagement-side engagement device with respect to the increase in rotation speed of the input member, and torque required for increasing rotation speed of the input member, and/or the like.

RELATED ART DOCUMENT

Patent Document

[Patent Document 1] Japanese Patent Application Publication No. 2009-6735 (JP 2009-6735 A)

SUMMARY OF THE INVENTION

Problem to be Solved by the Invention

Accordingly, a control device is demanded that can suppress occurrence of torque shock accompanying engagement of the engagement-side engagement device after a shift speed with a speed ratio larger than that of the current shift speed is determined as the target shift speed in a state where the required driving force for wheels is low.

Means for Solving the Problem

A characteristic structure of a control device for controlling a vehicle driving apparatus according to the present invention, including an input member drive-coupled to a driving force source, an output member drive-coupled to wheels, and a speed change mechanism which changes rotation speed from the input member according to a speed ratio of a shift speed formed by releasing or engaging a plurality of engagement devices among a plurality of shift speeds having different speed ratios and transmits the changed rotation speed to the output member, resides in that it includes:

a shift control section which, when a target shift speed determined according to a required driving force for the wheels and vehicle speed becomes a shift speed different from the current shift speed, releases a release-side engagement device which is at least one of the engagement devices forming the current shift speed, and engages an engagement-side engagement device which is at least one of the engagement devices forming the target shift speed, thereby making the speed change mechanism form the target shift speed, wherein when a shift speed larger in speed ratio than the current shift speed is determined as the target shift speed in a state where the required driving force is equal to or less than a predetermined control judgment value, the shift control section judges that an implementing condition of engagement limited downshift control is met, starts transition control to cause the release-side engagement device to transition from a direct-coupled engagement state to a non-direct-coupled engagement state and, after the release-side engagement device transitions to a non-direct-coupled engagement state, starts increasing rotation speed control to control output torque of the driving force source so that rotation speed of the input member becomes higher than synchronized rotation speed, which is rotation speed of the input member when the target shift speed is formed in the speed change mechanism, and after rotation speed of the input member becomes higher than the synchronized rotation speed, the shift control section starts differential rotation speed control to control output torque of the driving force source so that rotation speed of the input member becomes close to target rotation speed set higher than the synchronized rotation speed, and prohibits engagement of the engagement-side engagement device at least until rotation speed of the input member becomes higher than the synchronized rotation speed.

Note that in the present application, "drive-coupled" refers to a state in which two rotation elements are coupled so as to be capable of transmitting a driving force, and is used as a concept including a state in which the two rotation elements are coupled to rotate integrally or a state in which the two rotation elements are coupled to be capable of transmitting a driving force via one or more transmission members. Such transmission members include various members transmitting a rotation at the same speed or at a changed speed, and include, for example, shafts, gear mechanisms, belts, chains, and the like. Further, as such transmission members, engagement devices which selectively transmit a rotation and a driving force such as, for example, friction engagement devices, meshing type engagement devices, or the like may be included.

With the above characteristic structure, after a shift speed with a larger speed ratio is determined as the target shift speed, engagement of the engagement-side engagement device is prohibited until rotation speed of the input member becomes higher than the synchronized rotation speed, and thus it is possible to prevent engagement of the engagement-side engagement device while rotation speed of the input member is increased to the synchronized rotation speed. Therefore, it is possible to prevent variation of torque to be transmitted to the wheel side and occurrence of torque shock due to deviation of timing to increase the engagement pressure of the engagement-side engagement device with respect to the increase in rotation speed of the input member, torque required for increasing rotation speed of the input member, and the like.

When rotation speed of the input member is higher than the synchronized rotation speed, if the engagement pressure for engaging the engagement-side engagement device is increased, positive torque is transmitted from the input member side to the output member side. With the above-described characteristic structure, after the release-side engagement device transitions to a non-direct-coupled engagement state, increasing rotation speed control is started to control output torque of the driving force source so that rotation speed of the input member becomes higher than synchronized rotation speed, and engagement of the engagement-side engagement device is prohibited until rotation speed of the input member becomes higher than the synchronized rotation speed. Thus, rotation speed of the input member when the engagement-side engagement device is engaged can be made higher than the synchronized rotation speed, and positive torque can be transmitted from the input member side to the output member side.

Therefore, when there is a request to transmit positive torque from the input member side to the output member side as in the case where the required driving force increases after rotation speed of the input member becomes higher than the synchronized rotation speed, the case where creep torque for making the vehicle travel at very low speed is generated, or the like, the engagement-side engagement device can be engaged, and the positive torque corresponding to the request can be transmitted to the output member side.

Further, with the above-described characteristic structure, since the differential rotation speed control is started after rotation speed of the input member becomes higher than the synchronized rotation speed, rotation speed of the input member can be maintained precisely in a state of being higher than the synchronized rotation speed. Thus, as described above, after rotation speed of the input member becomes higher than the synchronized rotation speed, when there is a request to transmit positive torque from the input member side to the output member side and the engagement-side engagement device is engaged, occurrence of torque shock can be suppressed precisely.

Here, preferably, when both the conditions that rotation speed of the input member becomes higher than the synchronized rotation speed and that the required driving force is equal to or more than an acceleration judgment value, which is set equal to or higher than the control judgment value, are met, the shift control section makes the engagement-side engagement device transition to a slip engagement state.

With this structure, the engagement-side engagement device is caused to transition to a slip engagement state when both the conditions that rotation speed of the input member becomes higher than the synchronized rotation speed and that the required driving force is equal to or more than an acceleration judgment value are met. Therefore, the positive torque corresponding to the required driving force can be transmitted to the wheel side and occurrence of torque shock can be suppressed.

In the case where rotation speed of the input member becomes higher than the synchronized rotation speed and thereafter the required driving force increases to be equal to or more than the acceleration judgment value as a specific example in which the above both conditions are met, after the required driving force becomes equal to or more than the acceleration judgment value, the engagement-side engagement device is quickly caused to transition to a slip engagement state, so as to transmit the positive torque corresponding to the required driving force to the wheel side.

Further, in the case where after the engagement limited downshift control is started, when the required driving force increases to be equal to or higher than the acceleration judgment value in a period until rotation speed of the input member becomes higher than the synchronized rotation speed as another specific example, engagement of the engagement-side engagement device is prohibited until rotation speed of the input member becomes higher than the synchronized rotation speed. Thus, it is possible to prevent torque shock caused by negative torque inverted in positive or negative sign with respect to the required driving force, the negative torque transmitted from the input member side to the output member side. Then, after rotation speed of the input member becomes higher than the synchronized rotation speed, the engagement-side engagement device is quickly caused to transition to a slip engagement state, and the positive torque corresponding to the required driving force can be transmitted to the wheel side.

Here, preferably, when rotation speed of the input member or the synchronized rotation speed becomes equal to or more than a predetermined direct-coupling judgment value, the shift control section starts transition control to cause the engagement-side engagement device to transition to a direct-coupled engagement state.

When rotation speed of the input member or the synchronized rotation speed becomes high due to increase in vehicle speed or the like, it is desired to form a target shift speed in the speed change mechanism, so as to make the speed change mechanism return to a normal shift state.

With the above-described structure, when rotation speed of the input member or the synchronized rotation speed becomes equal to or more than the direct-coupling judgment value, the engagement-side engagement device is caused to transition to a direct-coupled engagement state, so as to make the speed change mechanism form the target shift speed.

Here, preferably, when rotation speed of the input member or the synchronized rotation speed becomes equal to or less than a predetermined slip judgment value after rotation speed of the input member becomes higher than the synchronized rotation speed, the shift control section starts transition control to cause the engagement-side engagement device to transition to a slip engagement state.

When the vehicle speed decreases, there may be cases where it is desired to generate creep torque for making the vehicle travel at very low speed. With the above-described structure, when rotation speed of the input member or the synchronized rotation speed becomes equal to or less than the predetermined slip judgment value, the engagement-side engagement device is caused to transition to a slip engagement state, so as to transmit the creep torque from the input member side to the output member side.

Here, preferably, at least an internal combustion engine is provided as the driving force source, and when the internal combustion engine is in an operating state and rotation speed of the input member or the synchronized rotation speed becomes equal to or less than a predetermined lower limit rotation speed, the shift control section starts lower limit rotation speed control to control output torque of the driving force source so that rotation speed of the input member becomes close to predetermined target rotation speed.

When the internal combustion engine is in an operating state and rotation speed of the input member or the synchronized rotation speed decreases due to decrease in vehicle speed or the like, it is desired to maintain rotation speed of the input member to be equal to or more than a minimum rotation speed at which combustion of the internal combustion engine continues stably. With the above-described structure, when rotation speed of the input member or the synchronized rotation speed becomes equal to or less than the lower limit rotation speed, the lower limit rotation speed control can be started, so as to maintain rotation speed of the input member to be equal to or more than the minimum rotation speed.

Here, preferably, when the target shift speed is changed to a shift speed with a largest speed ratio as a shift speed larger in speed ratio than the current shift speed in a state where the required driving force is equal to or less than the predetermined control judgment value, the shift control section judges that the implementing condition of the engagement limited downshift control is met.

As the speed ratio of the target shift speed increases, amplification of the torque variation generated when the engagement-side engagement device is engaged increases and the amplified torque variation is transmitted to the output member. Thus, when the target shift speed is changed to the shift speed with a largest speed ratio, the need for the engagement limited downshift control to prohibit engagement of the engagement-side engagement device increases. With the above-described structure, when the target shift speed is changed to the shift speed with a largest speed ratio, it is judged that the implementing condition of the engagement limited downshift control is met, and thus the effect of reducing a torque shock can be made large.

Further, when the target shift speed is changed to the shift speed with a largest speed ratio in a state where the required driving force is low, normally, it is a state in which the vehicle speed is low, and the need to transmit braking torque, which is negative torque, from the driving force source side to the wheel side is low. Thus, as in the above-described structure, when the target shift speed is changed to the shift speed with a largest speed ratio, and it is judged that the implementing condition of the engagement limited downshift control is met and engagement of the engagement-side engagement device is prohibited, torque shock can be reduced without impairing braking of the vehicle.

MODES FOR CARRYING OUT THE INVENTION

Figure 1:
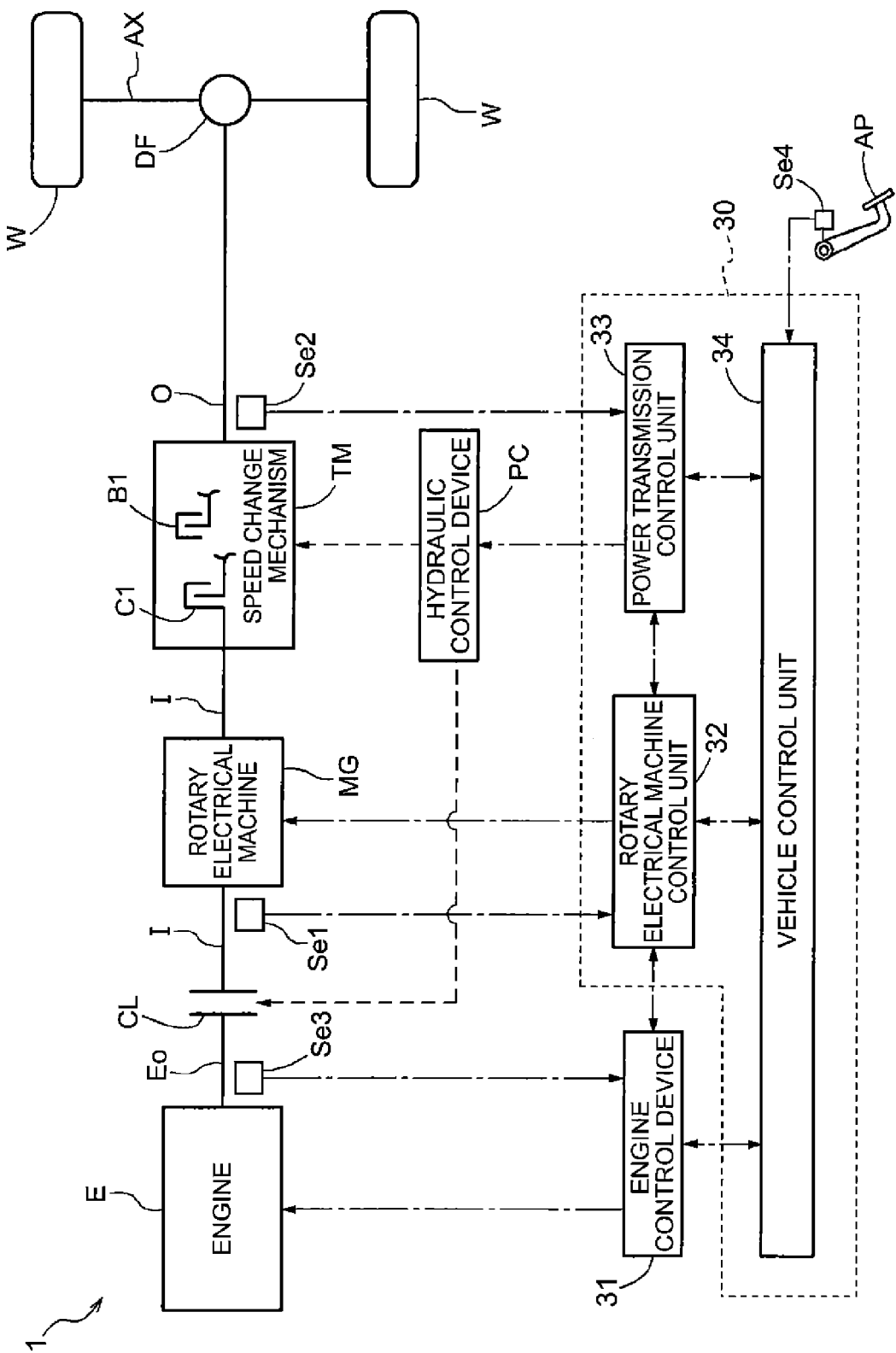
FIG. 1 is a schematic diagram illustrating schematic structures of a vehicle driving apparatus and a control device according to an embodiment of the present invention.

Embodiments of a control device 30 according to the present invention will be described with reference to the drawings. FIG. 1 is a schematic diagram illustrating schematic structures of a vehicle driving apparatus 1 and a control device 30 according to this embodiment. In this diagram, a solid line denotes a transmission path of a driving force, a dashed line denotes a supply path of hydraulic oil, and a dot and dash line denotes a transmission path of a signal.

In this embodiment, the control device 30 is a device for controlling the vehicle driving apparatus 1 including an input shaft I drive-coupled to a driving force source having a rotary electrical machine MG and an engine E, an output shaft O drive-coupled to wheels W, and a speed change mechanism which changes rotation speed from the input shaft I according to the speed ratio of a shift speed formed by releasing or engaging a plurality of engagement devices B1, C1, . . . , among a plurality of shift speeds having different speed ratios and transmits the changed rotation speed to the output shaft O. In this embodiment, the engine E is drive-coupled to the input shaft I via an engine disconnecting clutch CL. Note that the input shaft I corresponds to an "input member" in the present invention, and the output shaft O corresponds to an "output member" in the present invention.

Further, the control device 30 has a rotary electrical machine control unit 32 controlling the rotary electrical machine MG, a power transmission control unit 33 controlling a speed change mechanism TM and the engine disconnecting clutch CL, and a vehicle control unit 34 performing control of the vehicle driving apparatus 1 integrally through these control devices. Further, an engine control device 31 controlling the engine E is also provided in a hybrid vehicle.

Figure 2:
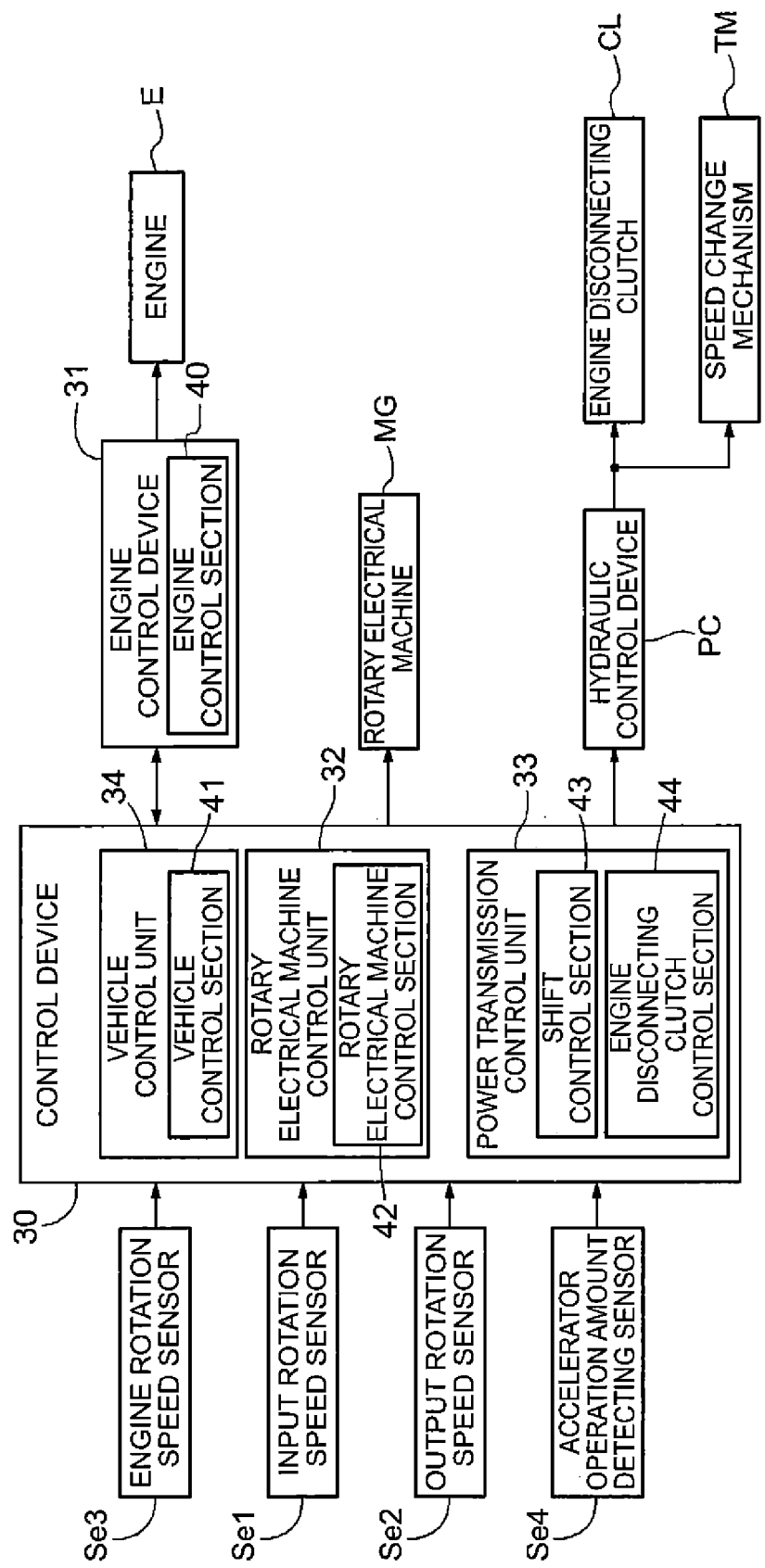
FIG. 2 is a block diagram illustrating a schematic structure of the control device according to the embodiment of the present invention.

In such a structure, the control device 30 according to this embodiment includes a shift control section 43 as illustrated in FIG. 2. The shift control section 43 performs transmission control such that when a target shift speed determined according to a required driving force for the wheels W and vehicle speed becomes a shift speed different from the current shift speed, a release-side engagement device which is at least one of the engagement devices forming the current shift speed is released, and an engagement-side engagement device which is at least one of the engagement devices forming the target shift speed is engaged, thereby making the speed change mechanism TM form the target shift speed.

When a shift speed larger in speed ratio than the current shift speed is determined as the target shift speed in a state where the required driving force is equal to or less than a predetermined control judgment value, the shift control section 43 judges that an implementing condition of engagement limited downshift control is met, starts transition control to cause the release-side engagement device to transition from a direct-coupled engagement state to a non-direct-coupled engagement state and, after the release-side engagement device transitions from a direct-coupled engagement state to a non-direct-coupled engagement state, starts increasing rotation speed control to control output torque of the driving force source so that rotation speed of the input shaft I becomes higher than synchronized rotation speed after shifting, which is rotation speed of the input shaft I when the target shift speed is formed in the speed change mechanism TM. Then, after rotation speed of the input shaft I becomes higher than the synchronized rotation speed after shifting, the shift control section 43 starts synchronized parallel rotation speed control to control output torque of the driving force source so that rotation speed of the input shaft I becomes close to target rotation speed set higher than the synchronized rotation speed after shifting. Further, the shift control section 43 performs engagement limited downshift control to prohibit engagement of the engagement-side engagement device at least until rotation speed of the input shaft I becomes higher than the synchronized rotation speed after shifting. Note that the synchronized rotation speed after shifting corresponds to a "synchronized rotation speed" in the present invention, and the synchronized parallel rotation speed control corresponds to "differential rotation speed control" in the present invention.

1. A Structure of the Vehicle Driving Apparatus 1

First, a structure of the vehicle driving apparatus 1 of a hybrid vehicle according to this embodiment will be described. As illustrated in FIG. 1, the hybrid vehicle is a parallel-type hybrid vehicle which includes the engine E and the rotary electrical machine MG as a driving force source of the vehicle, the engine E and the rotary electrical machine MG being drive-coupled in series. The hybrid vehicle includes a speed change mechanism TM, and by this speed change mechanism TM, rotation speed of the engine E and the rotary electrical machine MG transmitted to the input shaft I is changed and converted in torque, and then transmitted to the output shaft O.

The engine E is an internal combustion engine driven by combustion of fuel, for which it is possible to use various types of publicly known engines, such as gasoline engines and diesel engines for example. In this example, an engine output shaft Eo, such as a crank shaft of the engine E is drive-coupled selectively via the engine disconnecting clutch CL to the input shaft I drive-coupled to the rotary electrical machine MG. That is, the engine E is selectively drive-coupled to the rotary electrical machine MG via the engine disconnecting clutch CL, which is a friction engagement element. Further, the engine output shaft Eo is provided with a damper, and is structured to be able to perform transmission to the wheel W side in a manner that variations of output torque and rotation speed due to intermittent combustion of the engine E are damped.

The rotary electrical machine MG has a stator fixed to a non-rotating member and a rotor supported rotatably on an inside in a radial direction at the position corresponding to this stator. The rotor of this rotary electrical machine MG is drive-coupled to the input shaft I so as to integrally rotate therewith. That is, in this embodiment, both the engine E and the rotary electrical machine MG are structured to be drive-coupled to the input shaft I. The rotary electrical machine MG is connected electrically to a battery as a power storage via an inverter performing DC-AC conversion. Then the rotary electrical machine MG is capable of serving both the function as a motor (electric motor) generating motive power while being supplied electric power and the function as a generator (electric generator) generating electric power with the supply of motive power. That is, the rotary electrical machine MG is powered to drive while being supplied electric power from the battery via the inverter or generates electric power by a rotary driving force transmitted from the engine E or the wheels W, and the generated electric power is stored in the battery via the inverter.

To the input shaft I to which the driving force source is drive-coupled, the speed change mechanism TM is drive-coupled. In this embodiment, the speed change mechanism TM is a stepped automatic transmission having a plurality of shift speeds having different speed ratios. The speed change mechanism TM includes a gear mechanism such as a planetary gear mechanism and a plurality of engagement devices B1, C1, . . . , so as to form the plurality of shift speeds. This speed change mechanism TM changes rotation speed from the input shaft I and converts the torque thereof with the speed ratio of each shift speed, and outputs the converted torque to the output shaft O. The torque transmitted from the speed change mechanism TM to the output shaft O is transmitted and distributed to two, left and right axles AX via an output differential gear device DF, and then transmitted to the wheels W drive-coupled to the respective axles AX. Here, the speed ratio is a ratio of rotation speed of the input shaft I to rotation speed of the output shaft O when each shift speed is formed in the speed change mechanism TM, and in the present invention it is a value obtained by dividing rotation speed of the input shaft I by rotation speed of the output shaft O. That is, rotation speed obtained by dividing rotation speed of the input shaft I by the speed ratio is rotation speed of the output shaft O. Further, torque obtained by multiplying torque transmitted from the input shaft I to the speed change mechanism TM by the speed ratio is the torque transmitted from the speed change mechanism TM to the output shaft O.

In this example, the plurality of engagement devices B1, C1, . . . , of the speed change mechanism TM and the engine disconnecting clutch CL are friction engagement elements such as clutches and brakes, each of which being structured to have a friction material. These friction engagement elements are each able to be controlled in its engagement pressure by controlling a hydraulic pressure supplied thereto, thereby allowing continuous control to increase or decrease a transfer torque capacity. As such friction engagement elements, for example, multi-plate wet clutches, multi-plate wet brakes, and the like are preferably used.

A friction engagement element transmits torque between its engagement members by friction of the engagement members. When there is a rotation speed difference (slip) between the engagement members of the friction engagement element, torque (slip torque) of the magnitude of a transfer torque capacity is transmitted from the member at a larger rotation speed to the member at a smaller rotation speed by kinetic friction. When there is no rotation speed difference (slip) between the engagement members of the friction engagement element, the friction engagement element transmits torque operating between the engagement members of the friction engagement element by static friction with the magnitude of the transfer torque capacity being an upper limit. Here, the transfer torque capacity is the magnitude of maximum torque which the friction engagement element can transmit by friction. The magnitude of the transfer torque capacity changes in proportion to an engagement pressure of the friction engagement element. The engagement pressure is a pressure to press an input side engagement member (friction plate) and an output side engagement member (friction plate) against each other. In this embodiment, the engagement pressure changes in proportion to the magnitude of hydraulic pressure being supplied. That is, in this embodiment, the magnitude of the transfer torque capacity changes in proportion to the magnitude of the hydraulic pressure being supplied to the friction engagement element.

Each friction engagement element includes a return spring and is biased to the release side by a reaction force of the spring. Then, when a force generated by the hydraulic pressure supplied to a hydraulic cylinder of the friction engagement element exceeds the reaction force of the spring, the transfer torque capacity starts to occur in the friction engagement element, and the friction engagement element changes from a release state to an engagement state. The hydraulic pressure at a time when the transfer torque capacity starts to occur is referred to as a stroke end pressure. The friction engagement element is structured to increase its transfer torque capacity in proportion to increase in hydraulic pressure after the supplied hydraulic pressure exceeds the stroke end pressure. Note that the friction engagement element may be structured to have no return spring and be controlled by a differential pressure of hydraulic pressure applied to both sides of the piston of the hydraulic cylinder.

In this embodiment, the engagement state is a state in which the transfer torque capacity is generated in the friction engagement element, and includes a slip engagement state and a direct-coupled engagement state. The release state is a state in which the transfer torque capacity is not generated in the friction engagement element. Further, the slip engagement state is an engagement state in which there is a rotation speed difference (slip) between engagement members of the friction engagement element, and the direct-coupled engagement state is an engagement state in which there is no rotation speed difference (slip) between engagement members of the friction engagement element. Moreover, the non-direct-coupled engagement state is an engagement state other than the direct-coupled engagement state, and includes a release state and a slip engagement state.

2. A Structure of a Hydraulic Control System

A hydraulic control system of the vehicle driving apparatus 1 includes a hydraulic control device PC for adjusting to a predetermined pressure the hydraulic pressure of hydraulic oil supplied from a hydraulic pump driven by the driving force source of the vehicle or a dedicated motor. Although detailed descriptions are omitted here, the hydraulic control device PC adjusts the opening of one or more regulating valves based on a signal pressure from a linear solenoid valve for hydraulic adjustment to adjust the amount of hydraulic oil to be drained from the regulator valve or valves, so as to adjust the hydraulic pressure of the hydraulic oil to one or more predetermined pressures. The hydraulic oil adjusted to a predetermined pressure is supplied, with a hydraulic pressure of each required level, to each friction engagement element or the like of the plurality of engagement devices B1, C1, . . . , of the speed change mechanism TM and the engine disconnecting clutch CL.

3. Structures of the Control Devices

Next, structures of the control device 30 and the engine control device 31 controlling the vehicle driving apparatus 1 will be described with reference to FIG. 2.

Control units 32 to 34 of the control device 30 and the engine control device 31 are structured to include an arithmetic processing device, such as a CPU, as a core member, and to have storage devices such as a RAM (Random Access Memory) structured such that data can be read therefrom or written therein by the arithmetic processing device and a ROM (Read Only Memory) structured such that data can be read therefrom by the arithmetic processing device. Then, by software (program) stored in the ROM or the like of the control device or separately provided hardware such as an arithmetic circuit, or by both of them, respective functional units 41 to 44 of the control device 30 are formed. Further, the control units 32 to 34 of the control device 30 and the engine control device 31 are structured to communicate with each other, sharing various types of information, such as detection information of sensors and control parameters, and performing cooperative control, thereby realizing functions of the respective functional units 41 to 44.

Further, the vehicle driving apparatus 1 includes sensors Se1 to Se4, and an electrical signal outputted from each sensor is inputted to the control device 30 and the engine control device 31. The control device 30 and the engine control device 31 calculate detection information of each sensor based on the inputted electrical signal.

An input rotation speed sensor Se1 is a sensor for detecting rotation speed of the input shaft I. Since the rotor of the rotary electrical machine MG is integrally drive-coupled to the input shaft I, the rotary electrical machine control unit 32 detects rotation speed (angular speed) of the rotary electrical machine MG and rotation speed of the input shaft I based on an input signal of the input rotation speed sensor Se1.

An output rotation speed sensor Se2 is a sensor for detecting rotation speed of the output shaft O. The power transmission control unit 33 detects rotation speed (angular speed) of the output shaft O based on an input signal of the output rotation speed sensor Se2. Further, rotation speed of the output shaft O is proportional to the vehicle speed, and thus the power transmission control unit 33 calculates the vehicle speed based on the input signal of the output rotation speed sensor Se2.

An engine rotation speed sensor Se3 is a sensor for detecting rotation speed of the engine output shaft Eo (engine E). The engine control device 31 detects rotation speed (angular speed) of the engine E based on an input signal of the engine rotation speed sensor Se3.

Further, an accelerator operation amount detecting sensor Se4 is a sensor for detecting an operation amount of an accelerator pedal AP operated by the driver, so as to detect an accelerator operation amount. The control device 30 detects the accelerator operation amount based on an input signal of the accelerator operation amount detecting sensor Se4.

3-1. Vehicle Control Unit 34

The vehicle control unit 34 includes a vehicle control section 41 performing control to integrate in the entire vehicle various types of torque control performed for the engine E, the rotary electrical machine MG, the speed change mechanism TM, and the engine disconnecting clutch CL, and the like, and engagement control of respective engagement devices, and the like.

The vehicle control section 41 calculates vehicle required torque, which is a required driving force for driving the wheels W according to the accelerator operation amount, the vehicle speed, and charge amount of the battery, and the like and also is torque to be transmitted from the input shaft I side to the output shaft O side, and decides operating modes of the engine E and the rotary electrical machine MG. The vehicle control unit 34 is a functional unit to perform integral control by calculating engine required torque which is output torque required from the engine E, rotary electrical machine required torque which is output torque required from the rotary electrical machine MG, and an engine disconnecting target torque capacity which is a transfer torque capacity required from the engine disconnecting clutch CL, and providing instruction on them to the other control units 32, 33 and the engine control device 31.

The vehicle control section 41 decides, as an operating mode, a parallel traveling mode in which the engine disconnecting clutch CL is engaged and the engine E is set in an operating state, an electric traveling mode in which the engine disconnecting clutch CL is released and the engine E is set in an operation stopped state, or the like.

3-2. Rotary Electrical Machine Control Unit 32

The rotary electrical machine control unit 32 includes a rotary electrical machine control section 42 controlling operation of the rotary electrical machine MG. In this embodiment, when an instruction on rotary electrical machine required torque is provided by the vehicle control unit 34, the rotary electrical machine control section 42 performs control to set the instructed rotary electrical machine required torque by the vehicle control unit 34 to an output torque instructed value so that the rotary electrical machine MG outputs torque of the output torque instructed value. Specifically, the rotary electrical machine control section 42 controls to turn on and off a plurality of switching elements provided in the inverter, so as to control output torque of the rotary electrical machine MG.

3-3. Engine Control Device 31

The engine control device 31 has an engine control section 40 performing an operating control of the engine E. In this embodiment, when an instruction on engine required torque is provided from the vehicle control unit 34, the engine control section 40 sets the instructed engine required torque from the vehicle control unit 34 as the output torque instructed value, and performs torque control so that the engine E outputs torque of the output torque instructed value. Further, when there is a combustion start request of the engine, the engine control device 31 judges that an instruction to start combustion of the engine E is provided, and performs control to start combustion of the engine E by starting fuel supply to and ignition of the engine E, or the like.

3-4. Power Transmission Control Unit 33

The power transmission control unit 33 includes a shift control section 43 performing control of the speed change mechanism TM and an engine disconnecting clutch control section 44 performing control of the engine disconnecting clutch CL.

3-4-1. Engine Disconnecting Clutch Control Section 44

The engine disconnecting clutch control section 44 controls the engagement state of the engine disconnecting clutch CL. In this embodiment, the engine disconnecting clutch control section 44 controls the hydraulic pressure supplied to the engine disconnecting clutch CL via the hydraulic control device PC so that the transfer torque capacity of the engine disconnecting clutch CL becomes close to the engine disconnecting target torque capacity instructed from the vehicle control unit 34. Specifically, the engine disconnecting clutch control section 44 provides an instruction on a target hydraulic pressure (instruction pressure) set based on the engine disconnecting target torque capacity to the hydraulic control device PC, and the hydraulic control device PC supplies the instructed hydraulic pressure (instruction pressure) to the engine disconnecting clutch CL.

3-4-2. Shift Control Section 43

The shift control section 43 is a functional unit controlling the speed change mechanism TM. The shift control section 43 determines a target shift speed according to a required driving force to the wheels W and vehicle speed, and makes the speed change mechanism TM form the target shift speed. In this embodiment, the shift control section 43 uses the accelerator operation amount and the shift position as the required driving force for determining the target shift speed. The shift control section 43 controls hydraulic pressures supplied to the engagement devices B1, C1, . . . , provided in the speed change mechanism TM via the hydraulic control device PC, so as to engage or release the engagement devices B1, C1, . . . , thereby making the speed change mechanism TM form the target shift speed. Specifically, the shift control section 43 provides an instruction on target hydraulic pressures (instruction pressures) of the engagement devices to the hydraulic control device PC, and the hydraulic control device PC supplies the instructed target hydraulic pressures (instruction pressures) to the respective engagement devices.

In this embodiment, the shift control section 43 has a shift map, and is structured to determine the target shift speed with reference to the shift map. The shift map is a map defining the relation of the accelerator operation amount and vehicle speed with the target shift speed in the speed change mechanism TM. A plurality of upshift lines and a plurality of downshift lines are set in the shift map, and when the vehicle speed and the accelerator operation amount change and cross an upshift line or a downshift line on the shift map, the shift control section 43 determines a new target shift speed in the speed change mechanism TM. Further, when there is a change of the shift position, the target shift speed is changed. For example, also when a change to a second range or a low range is detected, the target shift speed may be changed. Note that here the upshift means switching from a shift speed with a large speed ratio to a shift speed with a small speed ratio, and the downshift means switching from a shift speed with a small speed ratio to a shift speed with a large speed ratio.

When the target shift speed becomes different from the current shift speed, the shift control section 43 performs shift control to make the speed change mechanism TM form the target shift speed by releasing a release-side engagement device which is at least one of the engagement devices forming the current shift speed, and engaging an engagement-side engagement device which is at least one of the engagement devices forming the target shift speed. That is, the shift control section 43 performs what is called a switchover shift to release a release-side engagement device which is at least one of the engagement devices engaged before the shift control starts (before shifting), and engage an engagement-side engagement device which is at least one engagement device released before shifting among the engagement devices forming the target shift speed.

More specifically, an engagement device, which forms a shift speed before shifting and is not in common between the plurality of engagement devices forming the shift speed before shifting and the plurality of engagement devices forming a shift speed after shifting, is set as the release-side engagement device and is released. On the other hand, an engagement device, which forms the shift speed after shifting and is not in common between the shift speeds before and after shifting, is set as the engagement-side engagement device and is engaged. Note that any engagement device in common between the shift speeds before and after shifting is maintained in the engagement state before and after shifting.

For example, when the downshift is performed, the shift control section 43 performs downshift control to release a release-side engagement device which is one of engagement devices forming a high shift speed with a small speed ratio, and engage an engagement-side engagement device which is one engagement device released before shifting among the engagement devices forming a low shift speed with a large speed ratio.

Further, when the upshift is performed, the shift control section 43 performs upshift control to release a release-side engagement device which is one of engagement devices forming a low shift speed with a large speed ratio, and engage an engagement-side engagement device which is one engagement device released before shifting among the engagement devices forming a high shift speed with a small speed ratio.

Note that the upshift means switching from a shift speed with a large speed ratio to a shift speed with a small speed ratio, and the downshift means switching from a shift speed with a small speed ratio to a shift speed with a large speed ratio. Further, the speed ratios are set to be small in the order of first shift speed, second shift speed, third shift speed, fourth shift speed, fifth shift speed, sixth shift speed, . . . .

3-4-2-1. Engagement Limited Downshift Control

When a shift speed larger in speed ratio than the current shift speed is determined as the target shift speed in a state where the required driving force is equal to or less than a predetermined control judgment value, the shift control section 43 judges that an implementing condition of engagement limited downshift control is met, starts transition control to cause the release-side engagement device to transition from a direct-coupled engagement state to a non-direct-coupled engagement state and, after the release-side engagement device transitions from a direct-coupled engagement state to a non-direct-coupled engagement state, starts increasing rotation speed control to control output torque of the driving force source so that rotation speed of the input shaft I becomes higher than synchronized rotation speed after shifting, which is rotation speed of the input shaft I when the target shift speed is formed in the speed change mechanism TM. Then, after rotation speed of the input shaft I becomes higher than the synchronized rotation speed after shifting, the shift control section 43 starts synchronized parallel rotation speed control to control output torque of the driving force source so that rotation speed of the input shaft I becomes close to target rotation speed set higher than the synchronized rotation speed after shifting. Further, the shift control section 43 performs engagement limited downshift control to prohibit engagement of the engagement-side engagement device at least until rotation speed of the input shaft I becomes higher than the synchronized rotation speed after shifting.

In this embodiment, the shift control section 43 is structured to start the increasing rotation speed control after the release-side engagement device transitions from a direct-coupled engagement state to a release state. When the increasing rotation speed control is started after the release-side engagement device transitions to a release state in this manner, no transfer torque will be generated between engagement members of the release-side engagement device even if rotation speed of the input shaft I is changed and a rotation speed difference occurs between the engagement members of the release-side engagement device. Thus, transmission of torque to the wheel W side via the release-side engagement device can be suppressed, and hence occurrence of torque shock can be suppressed.

Further, in this embodiment, it is structured to set the target rotation speed higher by a constant rotation speed than the synchronized rotation speed after shifting. Since the target rotation speed is thus set higher by a constant rotation speed than the synchronized rotation speed after shifting, even when the synchronized rotation speed after shifting changes due to a change in vehicle speed, rotation speed of the input shaft I can be maintained precisely higher than the synchronized rotation speed after shifting. Further, since the target rotation speed is set higher by a constant rotation speed than the synchronized rotation speed after shifting, control behaviors of transition control to decrease rotation speed of the input shaft I to the synchronized rotation speed after shifting so as to cause the engagement-side engagement device to transition to a direct-coupled engagement state can be made stable, and occurrence of torque shock due to increase in engagement pressure of the engagement-side engagement device can be suppressed.

The shift control section 43 is structured to start transition control to cause the engagement-side engagement device to transition to a slip engagement state when rotation speed of the input shaft I or the synchronized rotation speed after shifting becomes equal to or less than a predetermined slip judgment value after rotation speed of the input shaft I becomes higher than the synchronized rotation speed after shifting.

On the other hand, the shift control section 43 is structured to start transition control to cause the engagement-side engagement device to transition to a direct-coupled engagement state when rotation speed of the input shaft I or the synchronized rotation speed after shifting becomes equal to or more than a predetermined direct-coupling judgment value.

Further, the shift control section 43 is structured to make the engagement-side engagement device transition to a slip engagement state when both the conditions that rotation speed of the input shaft I becomes higher than the synchronized rotation speed after shifting and that the required driving force is equal to or more than an acceleration judgment value, which is set equal to or higher than the control judgment value, are met.

Further, the shift control section 43 is structured to start, when the engine E is in an operating state and rotation speed of the input shaft I or the synchronized rotation speed after shifting becomes equal to or less than a predetermined lower limit rotation speed, lower limit rotation speed control to control the output torque of the driving force source so that rotation speed of the input member becomes close to predetermined target rotation speed. Here, a state in which the engine E is in an operating state means a state in which the input shaft I and the engine E are rotating integrally, and in this embodiment, the engine disconnecting clutch is in a direct-coupled engagement state.

The shift control section 43 is structured to judge that the implementing condition of the engagement limited downshift control is met when the target shift speed is changed to the first shift speed, which is a shift speed with a largest speed ratio, as a shift speed larger in speed ratio than the current shift speed in a state where the required driving force is equal to or less than the predetermined control judgment value. Such cases include the cases where the target shift speed is changed from the second shift speed to the first shift speed, the target shift speed is changed from the third shift speed to the first shift speed, and the like. Note that when it is structured such that the first shift speed will not be determined as the target shift speed, i.e., when starting of the vehicle at the second shift speed is judged, or the like, it may be judged that the implementing condition of the engagement limited downshift control is met when the target shift speed is changed from the third shift speed to the second shift speed, or in similar cases.

Figure 3:
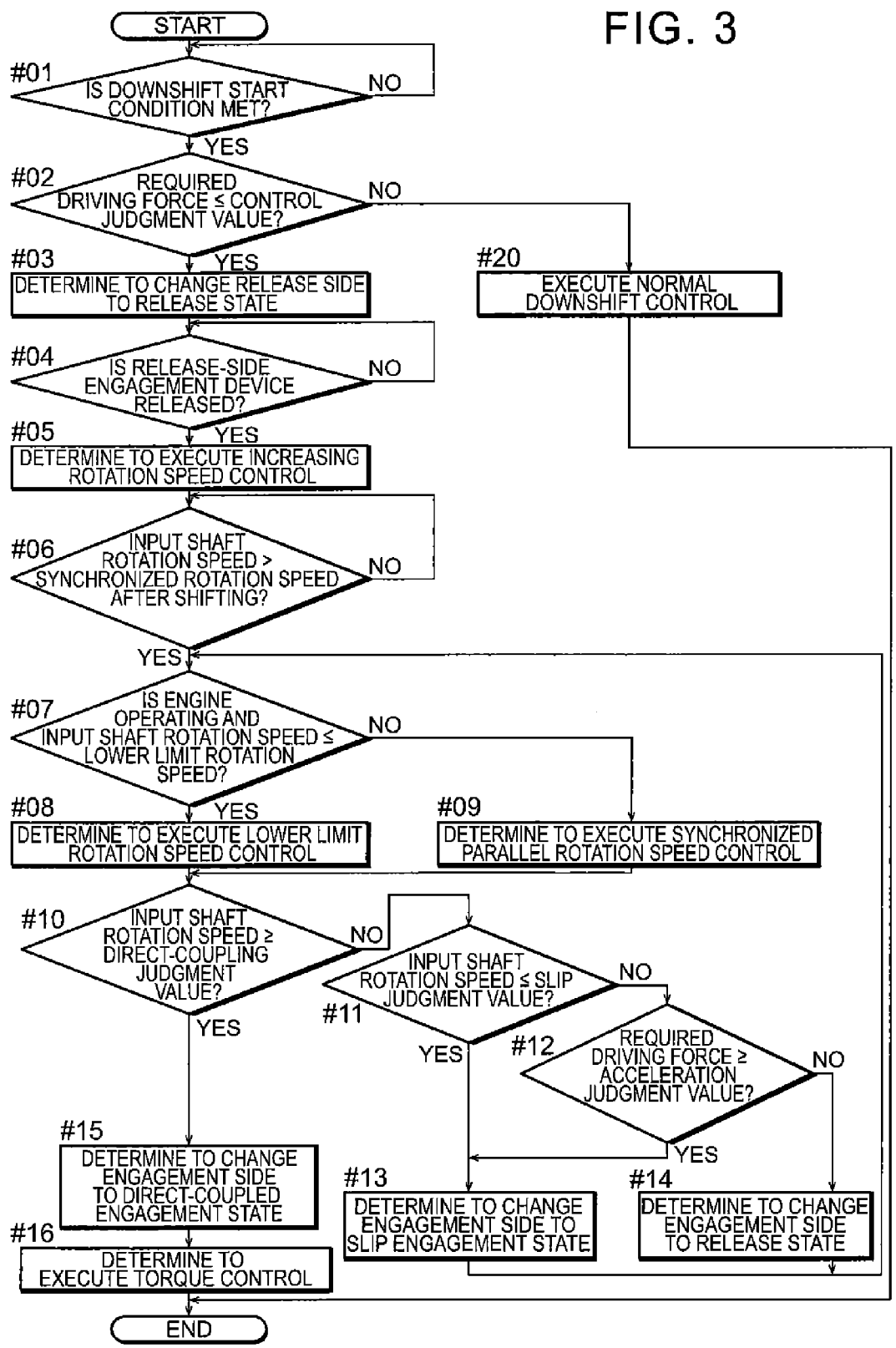
FIG. 3 is a flowchart illustrating processing of engagement limited downshift control according to the embodiment of the present invention.

The shift control section 43 according to this embodiment as described above can be structured as illustrated in an example of a flowchart illustrating in FIG. 3.

When a shift speed (first shift speed in this embodiment) larger in speed ratio than the current shift speed is determined as the target shift speed (step #01: Yes), the shift control section 43 judges that the starting condition of the downshift control is met, and the series of the downshift control is started.

Then, when the required driving force is equal to or less than the control judgment value (step #02: Yes), the shift control section 43 judges that the implementing condition of the engagement limited downshift control is met, and starts the series of the engagement limited downshift control from step #03 to step #14.

On the other hand, when the required driving force is larger than the control judgment value (step #02: No), the shift control section 43 judges that the implementing condition of the engagement limited downshift control is not met and executes normal downshift control (step #20).

In the normal downshift control, engagement of the engagement-side engagement device will not be prohibited until rotation speed of the input shaft I becomes higher than the synchronized rotation speed after shifting as in the engagement limited downshift control, and after the downshift control is started, the release-side engagement device is released and the engagement-side engagement device is engaged, thereby forming the target shift speed.

After it is judged that the implementing condition of the engagement limited downshift control has been met, the shift control section 43 determines to cause the release-side engagement device to transition to a non-direct-coupled engagement state (release state in this embodiment) (step #03), and starts transition control to cause the release-side engagement device to transition from a direct-coupled engagement state to a non-direct-coupled engagement state.

Then, when it is judged that the release-side engagement device has transitioned to a non-direct-coupled engagement state (release state in this embodiment) (step #04: Yes), the shift control section 43 determines to execute the increasing rotation speed control to control output torque of the driving force source so that rotation speed of the input shaft I becomes higher than the synchronized rotation speed after shifting, and starts the increasing rotation speed control (step #05).

Then, when it is judged that rotation speed of the input shaft I has become higher than the synchronized rotation speed after shifting (step #06: Yes) and the condition of step #07, which will be described later, is not met (step #07: No), the shift control section 43 determines to execute the synchronized parallel rotation speed control to control output torque of the driving force source so that rotation speed of the input shaft I becomes close to the target rotation speed set higher by a constant rotation speed than the synchronized rotation speed after shifting, ends the increasing rotation speed control, and starts the synchronized parallel rotation speed control (step #09).

After it is judged that rotation speed of the input shaft I has become higher than the synchronized rotation speed after shifting in step #06, when it is judged that the engine E is in an operating state and rotation speed of the input shaft I or the synchronized rotation speed after shifting is equal to or less than the predetermined lower limit rotation speed (step #07: Yes) while step #07 to step #14 are repeatedly executed, the shift control section 43 determines to execute the lower limit rotation speed control (step #08), or otherwise (step #07: No) determines to execute the synchronized parallel rotation speed control (step #09).

As a specific example, after rotation speed of the input shaft I has become higher than the synchronized rotation speed after shifting, when the shift control section 43 judges that rotation speed of the input shaft I or the synchronized rotation speed after shifting has become equal to or less than the lower limit rotation speed due to decrease in vehicle speed or the like and the engine E is operated (step #07: Yes) while the engagement limited downshift control is executed continuously (step #07 to step #14 are executed repeatedly), the shift control section 43 determines to execute the lower limit rotation speed control, ends the synchronized parallel rotation speed control, and starts the lower limit rotation speed control (step #08). On the other hand, when the shift control section 43 judges that rotation speed of the input shaft I or the synchronized rotation speed after shifting became larger than the lower limit rotation speed due to increase in vehicle speed or the like and the engine E is operated (step #07: No) while the engagement limited downshift control is executed continuously, the shift control section 43 determines to execute the synchronized parallel rotation speed control, ends the lower limit rotation speed control, and starts the synchronized parallel rotation speed control (step #09).

Further, while step #07 to step #14 are executed repeatedly after it is judged that rotation speed of the input shaft I has become higher than the synchronized rotation speed after shifting in step #06, the shift control section 43 determines a target engagement state of the engagement-side engagement device based on rotation speed of the input shaft I or the synchronized rotation speed after shifting, and causes the engagement state to transition from a release state to a slip engagement state or direct-coupled engagement state in step #10 to step #12, which will be described below. That is, when the engagement-side engagement device is engaged after rotation speed of the input shaft I has become higher than the synchronized rotation speed after shifting, engagement of the engagement-side engagement device is prohibited until rotation speed of the input shaft I becomes higher than the synchronized rotation speed after shifting.

Specifically, when it is judged that rotation speed of the input shaft I or the synchronized rotation speed after shifting has become equal to or more than the predetermined direct-coupling judgment value (step #10: Yes), the shift control section 43 determines to cause the engagement-side engagement device to transition to a direct-coupled engagement state (step #15). Then, the shift control section 43 starts transition control to cause the engagement-side engagement device to transition from a slip engagement state or release state to a direct-coupled engagement state. Further, when it is judged that rotation speed of the input shaft I or the synchronized rotation speed after shifting has become equal to or more than the direct-coupling judgment value (step #10: Yes), the shift control section 43 determines to execute torque control, ends the synchronized parallel rotation speed control or lower limit rotation speed control, and starts the torque control (step #16). Then, the shift control section 43 ends the engagement limited downshift control (End).

Further, when it is judged that rotation speed of the input shaft I or the synchronized rotation speed after shifting is equal to or less than the slip judgment value set lower than the direct-coupling judgment value (step #11: Yes), the shift control section 43 determines to cause the engagement-side engagement device to transition to a slip engagement state (step #13) so as to transmit creep torque, which will be described later, from the driving force source side to the wheel W side.

On the other hand, when rotation speed of the input shaft I or the synchronized rotation speed after shifting is lower than the direct-coupling judgment value (step #10: No) and higher than the slip judgment value (step #11: No), the shift control section 43 judges whether or not the required driving force is equal to or more than the acceleration judgment value (step #12). When it is judged that the required driving force is equal to or more than the acceleration judgment value (step #12: Yes), the shift control section 43 determines to cause the engagement-side engagement device to transition to a slip engagement state (step #13) so as to transmit the torque corresponding to the required driving force from the driving force source side to the wheel W side. On the other hand, when it is judged that the required driving force is less than the acceleration judgment value (step #12: No), the shift control section 43 determines not to transmit the driving force from the driving force source to the wheels W and determines to cause the engagement-side engagement device to transition to a release state (step #14).

Thus, when rotation speed of the input shaft I or the synchronized rotation speed after shifting is within the range from the direct-coupling judgment value to the slip judgment value, and the engagement-side engagement device is not controlled to be in a direct-coupled engagement state or slip engagement state for completing the downshift control or transmitting the creep torque, the engagement-side engagement device is controlled to be in a slip engagement state if the required driving force is equal to or more than the acceleration judgment value.

When the determined target engagement state of the engagement-side engagement device changes from a release state to a slip engagement state, the shift control section 43 starts transition control to cause the engagement-side engagement device to transition from a release state to a slip engagement state. When the determined target engagement state of the engagement-side engagement device changes from a release state to a direct-coupled engagement state, the shift control section 43 starts transition control to cause the engagement-side engagement device to transition from a release state to a direct-coupled engagement state. When the determined target engagement state of the engagement-side engagement device changes from a slip engagement state to a direct-coupled engagement state, the shift control section 43 starts transition control to cause the engagement-side engagement device to transition from a slip engagement state to a direct-coupled engagement state. When the determined target engagement state of the engagement-side engagement device changes from a slip engagement state to a release state, the shift control section 43 starts transition control to cause the engagement-side engagement device to transition from a slip engagement state to a release state.

Then, until it is judged that rotation speed of the input shaft I or the synchronized rotation speed after shifting becomes equal to or more than the predetermined direct-coupling judgment value (step #10: Yes), step #07 to step #14 are executed repeatedly, and the engagement limited downshift control is continued.

3-4-2-1-1. Problems of the Downshift Control

First, problems of the downshift control will be described based on a comparative example illustrated in FIG. 4.

Until time t01, the vehicle required torque serving as the required driving force is set to a small value (negative value in the example illustrated in FIG. 4), and the vehicle speed gradually decreases. Note that the engine disconnecting clutch CL is controlled to be in a direct-coupled engagement state, and the engine E is rotating integrally with the input shaft I.

At time t01, due to decrease in vehicle speed, the target shift speed is changed from the second shift speed to the first shift speed with a larger speed ratio, it is judged that the starting condition of the downshift control is met, and the downshift control is started. The comparative example illustrated in FIG. 4 is structured not to implement the engagement limited downshift control but to implement the normal downshift control, even when the vehicle required torque is equal to or less than the control judgment value. Thus, in the comparative example illustrated in FIG. 4, after the downshift control is started, engagement of the engagement-side engagement device is not prohibited until rotation speed of the input shaft I becomes higher than the synchronized rotation speed after shifting, and engagement of the engagement-side engagement device is started (at time t01).

When the starting condition of the downshift control is met (at time t01), transition control to cause the release-side engagement device to transition from a direct-coupled engagement state to a release state is started. In the comparative example illustrated in FIG. 4, when the transition control is started, there is started preliminary engagement pressure control to decrease the engagement pressure (instruction pressure) for the release-side engagement device from a complete engagement pressure to a preliminary engagement pressure, which will be described later (at time t01). Then, after the preliminary engagement pressure control is finished (at time t02), the engagement pressure (instruction pressure) for the release-side engagement device is decreased gradually from the preliminary engagement pressure to near zero so as to release the release-side engagement device (from time t02 to time t03).

On the other hand, when the starting condition of the downshift control is met (at time t01), transition control to cause the engagement-side engagement device to transition from a release state to a direct-coupled engagement state is started. In the comparative example illustrated in FIG. 4, after the transition control is started, the instruction pressure is set temporarily high so as to accelerate charging of hydraulic oil to the hydraulic cylinder (from time t01 to time t02). At this time, in the comparative example, in order to accelerate the charging of hydraulic oil as much as possible so as to finish the shift control quickly, the instruction pressure is set high and a period in which the instruction pressure is set high is set long so that the engagement pressure may overshoot with respect to the target engagement pressure. In the comparative example illustrated in FIG. 4, the case where the actual hydraulic pressure overshoots with respect to the target hydraulic pressure is illustrated, and due to this overshoot, transfer torque occurs in the engagement-side engagement device, output shaft transfer torque varies, and torque shock occurs as denoted by (1) in FIG. 4 (around time t02).

After the release-side engagement device transitions from a direct-coupled engagement state to a non-direct-coupled engagement state, which is a release state or slip engagement state, rotation speed of the input shaft I increases from the synchronized rotation speed before shifting to the synchronized rotation speed after shifting by torque transmitted through the engagement-side engagement device controlled to be in a slip engagement state (from time t03 to time t04). At this time, torque is transmitted from the output shaft O side to the input shaft I side via the engagement-side engagement device, as denoted by (2) in FIG. 4, the output shaft transfer torque decreases relative to the vehicle required torque by the amount of this transfer torque, and a torque shock occurs (from time t03 to time t04).

Then, when it is judged that rotation speed of the input shaft I has increased to the synchronized rotation speed after shifting, the engagement pressure (instruction pressure) of the engagement-side engagement device is increased to the complete engagement pressure, and the engagement-side engagement device is caused to transition to a direct-coupled engagement state. When the engagement-side engagement device transitions to a direct-coupled engagement state, the target shift speed (first shift speed) is formed in the speed change mechanism TM. At this time, due to deviation of timing to increase the engagement pressure, or the like, when the engagement pressure is increased largely in a state where a rotation speed difference exists between engagement members of the engagement-side engagement device, slip torque to be transmitted through the engagement-side engagement device becomes large, and as denoted by (3) in FIG. 4, the output shaft transfer torque varies largely with respect to the vehicle required torque, which can cause a torque shock to occur (around time t04).

As the vehicle speed decreases, when it is judged that the vehicle speed or rotation speed of the input shaft I becomes equal to or less than an execution judgment value of creep torque output control (at time t05), the vehicle required torque is increased to torque corresponding to the target creep torque, and output torque of the driving force source is increased.

Then, to prevent decrease in rotation speed of the engine E, when it is judged that rotation speed of the input shaft I has become equal to or less than the judgment value for starting the lower limit rotation speed, transition control to cause the engagement-side engagement device to transition from a direct-coupled engagement state to a slip engagement state is started. After it is judged that the engagement-side engagement device has become a slip engagement state (at time t06 and thereafter), the lower limit rotation speed control is started, and rotation speed of the input shaft I is controlled to be close to the target rotation speed. At this time, when the lower limit rotation speed control is started before the engagement-side engagement device transitions from a direct-coupled engagement state to a slip engagement state due to deviation of timing to start the lower limit rotation speed control, or the like, output torque of the driving force source varies as denoted by (4) in FIG. 4 in order to control rotation speed of the input shaft I attempting to decrease along the synchronized rotation speed after shifting to be the target rotation speed, which may cause a torque shock to occur in the output shaft transfer torque (around time t06).

Figure 4:
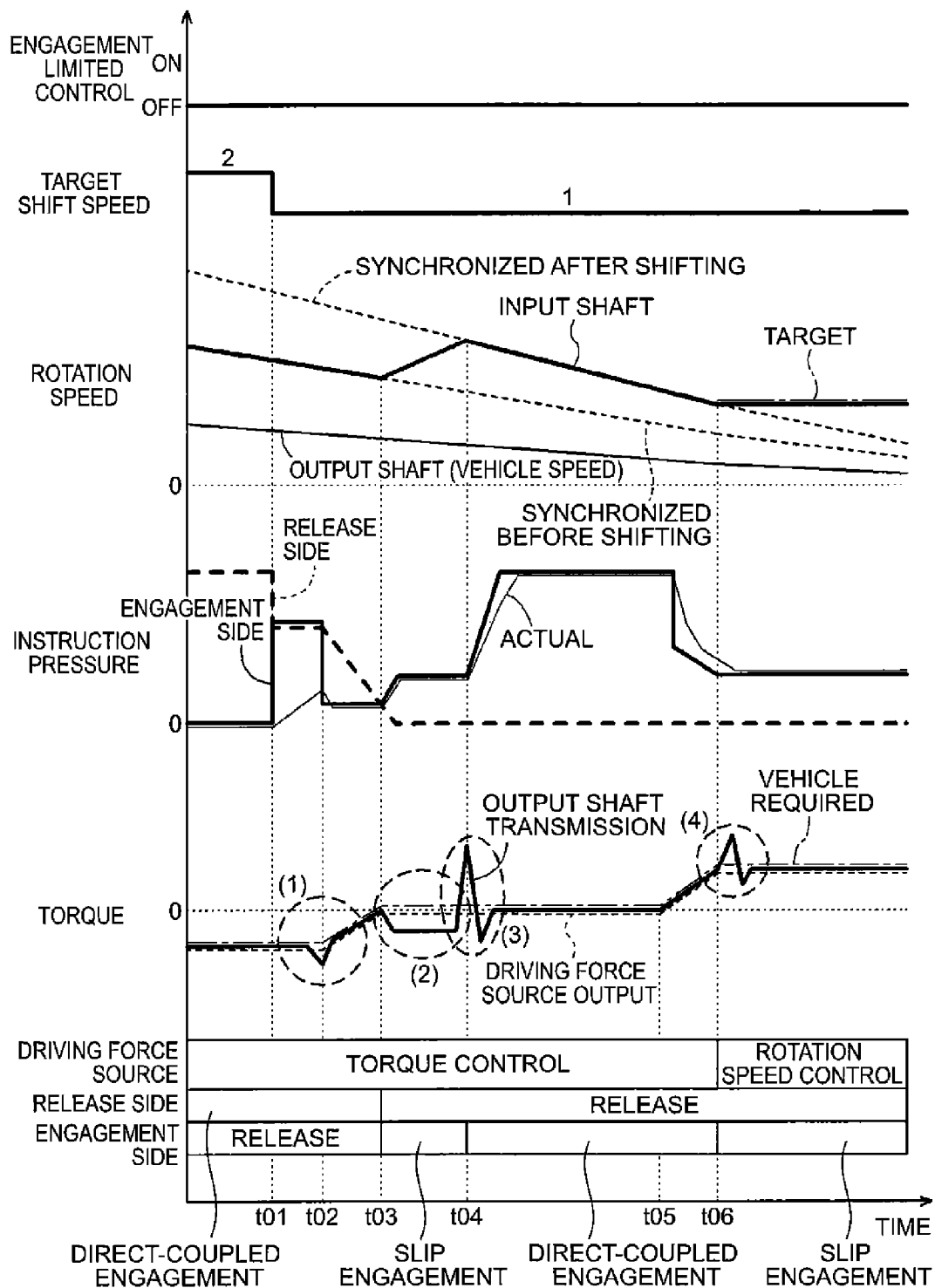
FIG. 4 is a timing chart for explaining processing of driving force auxiliary control according to a comparative example of the present invention.

As described above, in the case where the normal downshift control is executed, when the engagement-side engagement device is caused to transition to a direct-coupled engagement state after the downshift control is started, a torque shock may occur in the output shaft transfer torque as denoted by (1) to (3) in FIG. 4. Further, after the engagement-side engagement device is caused to transition to a direct-coupled engagement state, it is necessary to cause the engagement-side engagement device to transition from the direct-coupled engagement state to a slip engagement state in order to prevent decrease of rotation speed of the engine E. During this transition, a torque shock may occur in the output shaft transfer torque as denoted by (4) in FIG. 4.

Further, the above-described torque variation occurs at the first shift speed with a large speed ratio, and thus the torque variation is amplified at the shift speed with a large speed ratio and is transmitted to the output shaft O. Thus, the torque shock of the output shaft transfer torque may become large.

3-4-2-1-2. Operating Condition that the Vehicle Speed Decreases while the Engine is in an Operating State The engagement limited downshift control will be described with reference to a time chart for each of operating conditions.

First, an operating condition that the vehicle speed decreases while the engine E is in an operating state will be described with reference to an example illustrated in FIG. 5. This is an operating condition that Yes is judged in step #11 due to decrease in vehicle speed, and Yes is judged in step #07 in the flowchart of FIG. 3.

Until time t11, similarly to the period until time t01 of FIG. 4, the vehicle required torque serving as the required driving force is set to a small value (negative value), and the vehicle speed gradually decreases. Note that the engine disconnecting clutch CL is controlled to be in a direct-coupled engagement state, and the engine E is rotating.

The shift control section 43 judges at time t11 that the target shift speed is changed from the second shift speed to the first shift speed with a higher speed ratio due to decrease in vehicle speed and the starting condition of the downshift control is met (step #01: Yes in FIG. 3), and starts the downshift control. Further, the shift control section 43 judges that the vehicle required torque is equal to or less than the control judgment value (step #02: Yes in FIG. 3), and judges that the implementing condition of the engagement limited downshift control is met (engagement limited control: ON). In this embodiment, the control judgment value is set to the torque corresponding to given torque (creep torque in this example) equal to or less than the creep torque. Alternatively, the control judgment value may be set to the torque corresponding to the absolute value of traveling resistance torque (negative torque) transmitted from the wheels W to the output shaft O due to traveling resistance such as air resistance, tire friction resistance, and slope road resistance, and the like. In this case, the shift control section 43 can estimate the traveling resistance torque based on vehicle weight, vehicle speed, and road inclination. Alternatively, the shift control section 43 can estimate the traveling resistance torque based on changed speed of vehicle speed and output shaft transfer torque (vehicle required torque).

Then, the shift control section 43 determines to cause the release-side engagement device to transition to a release state (step #03), and starts transition control to cause the release-side engagement device to transition from a direct-coupled engagement state to a release state (at time t11). In the example illustrated in FIG. 5, when the shift control section 43 starts the transition control, the shift control section 43 starts the preliminary engagement pressure control to decrease the engagement pressure (instruction pressure) for the release-side engagement device from the complete engagement pressure to the preliminary engagement pressure (at time t11). Then, after the preliminary engagement pressure control is finished (at time t12), the engagement pressure (instruction pressure) of the release-side engagement device is decreased gradually from the preliminary engagement pressure to zero so that the release-side engagement device is released (from time t12 to time t13). Here, the complete engagement pressure is an engagement pressure (instruction pressure) which allows maintaining an engagement state without slipping even when torque to be transmitted from the driving force source to the engagement device varies. Further, the preliminary engagement pressure of the release-side engagement device is an engagement pressure (instruction pressure) set higher by a predetermined pressure than a minimum engagement pressure. The minimum engagement pressure is a smallest engagement pressure (instruction pressure) which allows transmitting to the output shaft O side all the torque of the driving force source transmitted to the input shaft I.

The shift control section 43 determines that the release-side engagement device has transitioned to a release state at time t13 (step #04: Yes), and starts the increasing rotation speed control to control output torque of the driving force source (step #05) so that rotation speed of the input shaft I becomes higher than the synchronized rotation speed after shifting. In this embodiment, the target rotation speed is increased gradually from the synchronized rotation speed before shifting to rotation speed larger than the synchronized rotation speed after shifting, and rotation speed of the input shaft I is increased from the synchronized rotation speed before shifting to rotation speed higher than the synchronized rotation speed after shifting (from time t13 to time t14).

Then, the shift control section 43 judges that rotation speed of the input shaft I has become higher than the synchronized rotation speed after shifting at time t14 (step #06: Yes), and since the engine E is in the operating state but rotation speed of the input shaft is larger than the lower limit rotation speed (step #07: No), the shift control section 43 finishes the increasing rotation speed control and starts the synchronized parallel rotation speed control (step #09). The target rotation speed is set to rotation speed obtained by adding a predetermined offset value to the synchronized rotation speed after shifting. Here, the synchronized rotation speed after shifting is rotation speed obtained by multiplying rotation speed of the output shaft O by the speed ratio of a target shift speed after it is changed (first shift speed in this example). Further, the synchronized rotation speed before shifting is rotation speed obtained by multiplying rotation speed of the output shaft O by the speed ratio of a target shift speed before shifting (second shift speed in this example).

The shift control section 43 judges at time t15 that rotation speed of the input shaft I which varies in parallel with the synchronized rotation speed after shifting becomes equal to or less than the slip judgment value due to decrease in vehicle speed (step #11: Yes), and starts transition control to cause the engagement-side engagement device to transition from a release state to a slip engagement state. Note that when it is judged that rotation speed of the input shaft I is equal to or less than the slip judgment value, the creep torque output control to transmit creep torque from the driving force source side to the wheels W is started (at time t15). Here, the creep torque output control is to transmit creep torque, by which the vehicle travels at very low speed (creep), from the driving force source side to the wheel W side when the accelerator operation amount is close to zero in the traveling range and the vehicle speed is low.

After the creep torque output control is started, the vehicle required torque is increased to the torque corresponding to the creep torque (at time t15). Further, the shift control section 43 increases the engagement pressure (instruction pressure) of the engagement-side engagement device to the minimum engagement pressure (instruction pressure) which allows transmitting the creep torque to the wheels W. At this time, rotation speed of the input shaft I is set higher than the synchronized rotation speed after shifting by the synchronized parallel rotation speed control, and thus positive torque can be transmitted from the input shaft I side to the output shaft O side by controlling the engagement-side engagement device to be in a slip engagement state.

Figure 5:
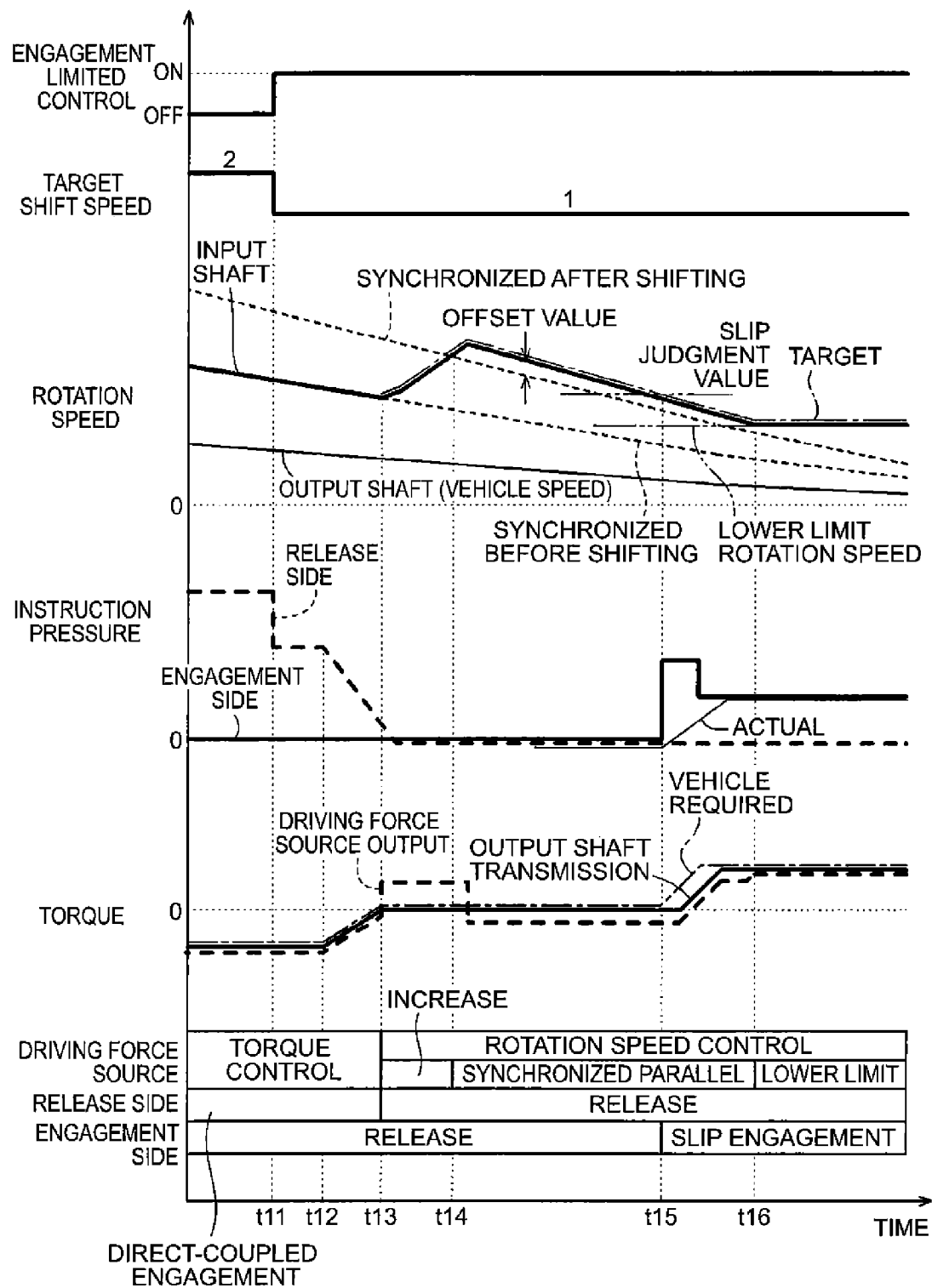
FIG. 5 is a timing chart for explaining processing of engagement limited downshift control according to the embodiment of the present invention.

Further, in the example illustrated in FIG. 5, after the transition control is started, the instruction pressure is set temporarily high in order to accelerate charging of hydraulic oil to the hydraulic cylinder (the period between time t15 and time t16). At this time, unlike the case where the normal downshift control is executed which is described with reference to FIG. 4, the need to quickly finish the shift control is low, and the need to accelerate the charging of hydraulic oil as much as possible is low. Thus, the instruction pressure can be set not too high and the period in which the instruction pressure is set high can be set not too long, and overshoots of the engagement pressure (hydraulic pressure) relative to the target engagement pressure (hydraulic pressure) can be suppressed. Thus, as illustrated in FIG. 5, overshoots of the actual hydraulic pressure relative to the target hydraulic pressure can be suppressed, and variations of the output shaft transfer torque to cause a torque shock can be suppressed (at time t15 to time t16).

Then, at time t16, the shift control section 43 judges that rotation speed of the input shaft I changing in parallel with the synchronized rotation speed after shifting becomes equal to or less than the lower limit rotation speed due to further decrease in vehicle speed (step #07: Yes), and finishes the synchronized parallel rotation speed control and starts the lower limit rotation speed control (step #08). The lower limit rotation speed is set in advance to be equal to or more than a minimum rotation speed so that combustion of the engine E continues stably.

The target rotation speed in the lower limit rotation speed control is also set in advance to be equal to or more than the minimum rotation speed, which is typically target rotation speed in an idling operating state.

Figure 6:
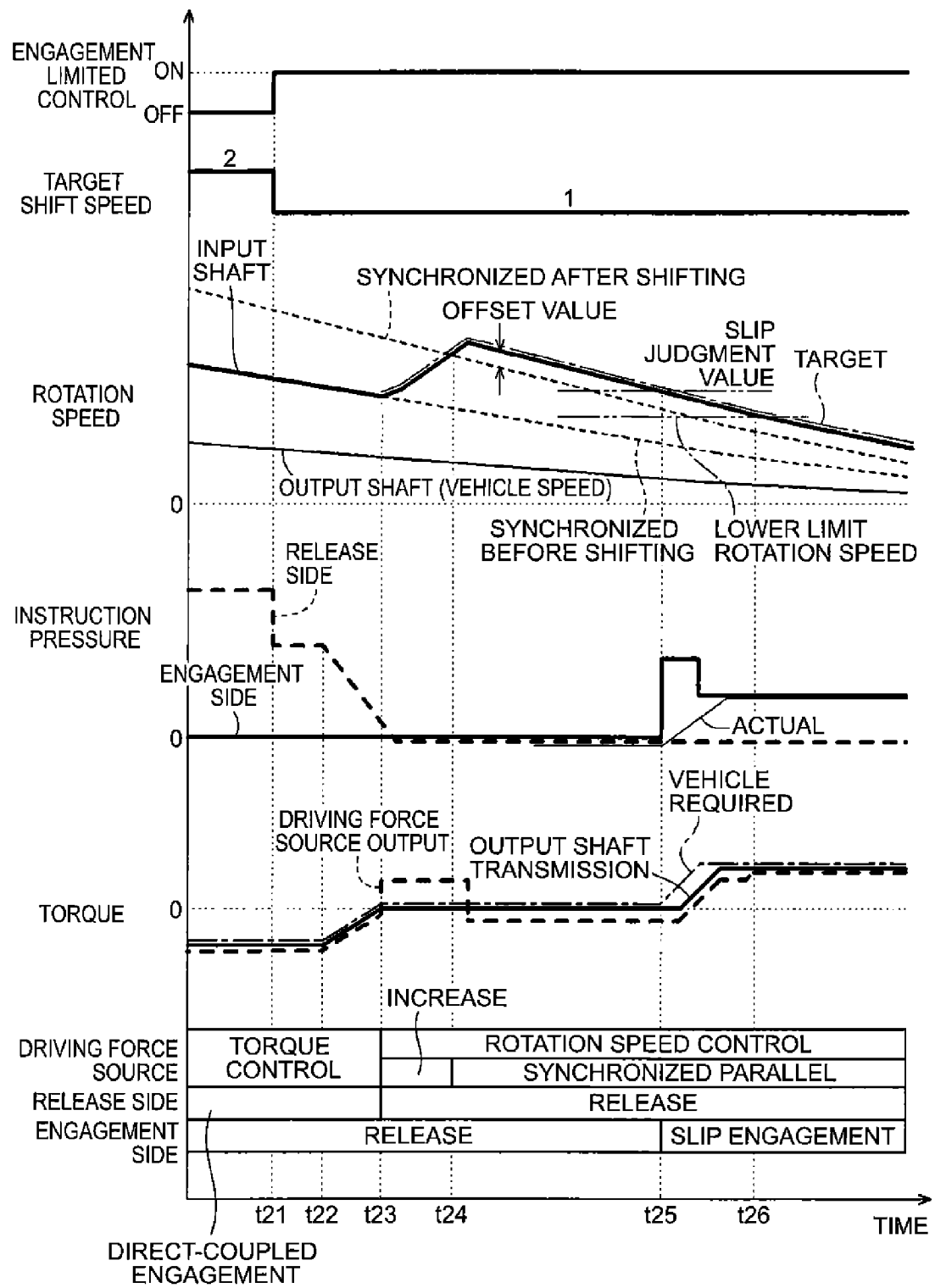
FIG. 6 is a timing chart for explaining processing of the engagement limited downshift control according to the embodiment of the present invention.

3-4-2-1-3. Operating Condition that the Vehicle Speed Decreases while the Engine is in an Operation Stopped State Next, an operating condition that the vehicle speed decreases while the engine E is in an operation stopped state will be described with reference to an example illustrated in FIG. 6. This is an operating condition that, in the flowchart of FIG. 3, Yes is judged in step #11 due to decrease in vehicle speed, but Yes is not judged in step #07 because the engine E is in an operation stopped state.

The period up to time t26 is the same as the period up to time t16 of FIG. 5 except whether the engine E is in an operating state or operation stopped state. That is, in the example illustrated in FIG. 6, the engine disconnecting clutch CL is controlled to be in a release state, and the engine E is not rotating integrally with the input shaft I.

Even when rotation speed of the input shaft I changing in parallel with the synchronized rotation speed after shifting becomes equal to or less than the lower limit rotation speed due to further decrease in vehicle speed at time t26, the engine E is in the operation stopped state (step #07: No), and thus, unlike the example illustrated in FIG. 5, it is not necessary to maintain rotation speed of the engine E to be equal to or more than the minimum rotation speed. Therefore, the shift control section 43 does not start the lower limit rotation speed control and continues the synchronized parallel rotation speed control (step #09).

Thus, rotation speed of the input shaft I changing in parallel with the synchronized rotation speed after shifting decreases to be less than the lower limit rotation speed as the vehicle speed decreases (at time t26 and thereafter).

3-4-2-1-4. First Example of Operating Condition that the Required Driving Force is Increased and the Vehicle Speed Increases Next, a first example of operating condition that the required driving force is increased and the vehicle speed increases after the engagement limited downshift control is started will be described with reference to FIG. 7. This is an operating condition that, in the flowchart of FIG. 3, after the engagement limited downshift control is started (step #03 and thereafter), the required driving force is increased to be equal to or more than the acceleration judgment value, Yes is judged in step #12, and thereafter Yes is judged in step #10 due to increase in vehicle speed.

The period up to time t34 is the same as the period up to time t14 of FIG. 5. Note that in the example illustrated in FIG. 7, the engine E behaves similarly in either the operating state or operation stopped state.

Figure 7:
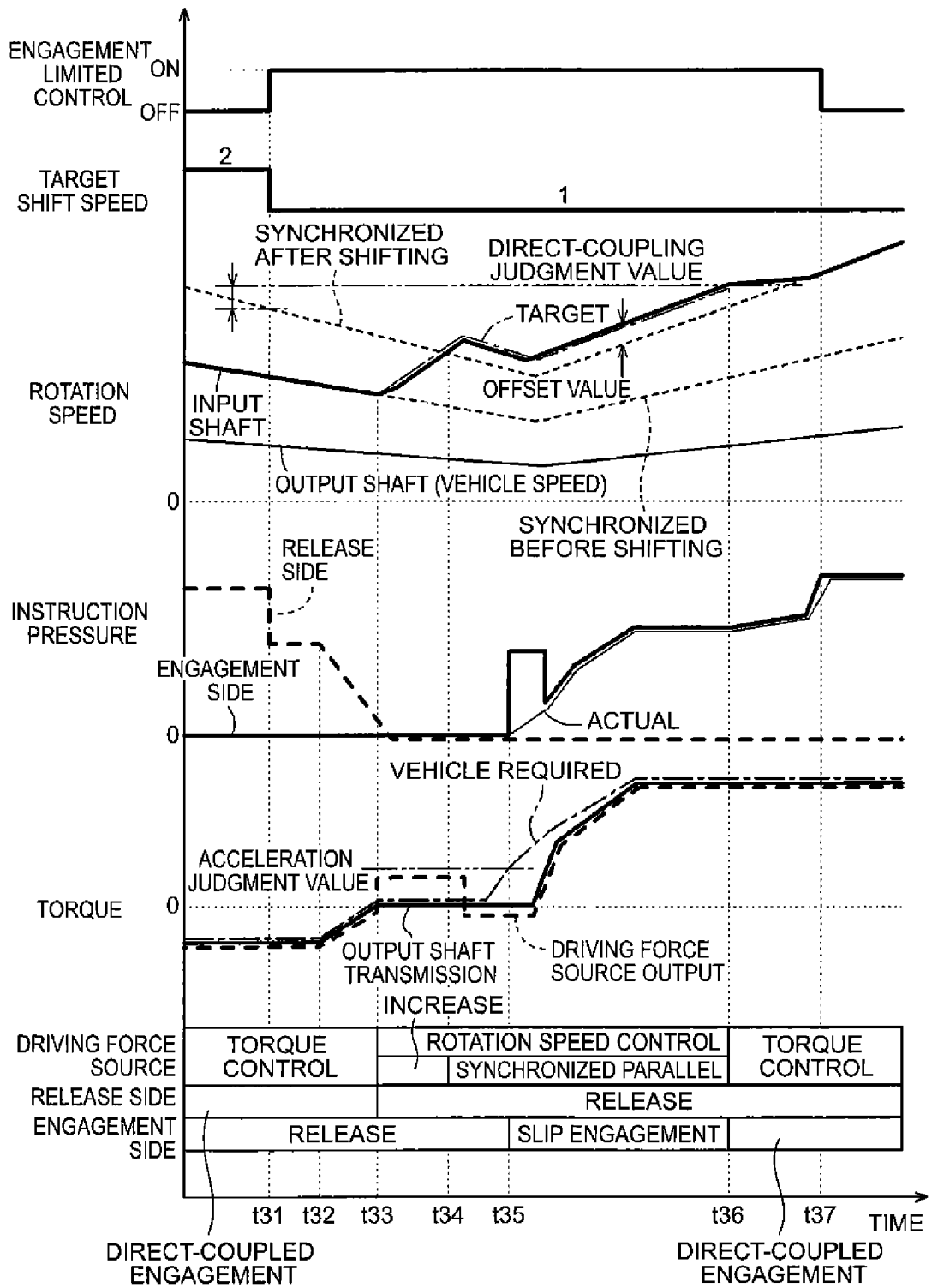
FIG. 7 is a timing chart for explaining processing of the engagement limited downshift control according to the embodiment of the present invention.

In the example illustrated in FIG. 7, the engagement limited downshift control is started (at time t31), and after it is judged at time t34 that rotation speed of the input shaft I has become higher than the synchronized rotation speed after shifting (step #06: Yes), increase in accelerator operation amount and/or the like occurs and the vehicle required torque increases. Then, the shift control section 43 judges at time t35 that the vehicle required torque is equal to or more than the acceleration judgment value (step #12: Yes), and starts transition control to cause the engagement-side engagement device to transition from a release state to a slip engagement state. In this embodiment, the acceleration judgment value is set to the torque corresponding to the creep torque.

After the transition control is started, the shift control section 43 increases the engagement pressure (instruction pressure) of the engagement-side engagement device corresponding to the increase in vehicle required torque so that the vehicle required torque can be transmitted to the wheel W side. In the example illustrated in FIG. 7, after the transition control is started, the instruction pressure is set temporarily high so as to accelerate charging of hydraulic oil to the hydraulic cylinder. After the actual hydraulic pressure of the engagement-side engagement device becomes larger than the stroke end pressure, the transfer torque capacity of the engagement-side engagement device increases from zero, and the output shaft transfer torque increases from zero. At this time, rotation speed of the input shaft I is set higher than the synchronized rotation speed after shifting by the synchronized parallel rotation speed control, and thus positive torque can be transmitted from the input shaft I side to the output shaft O side by controlling the engagement-side engagement device to be in the slip engagement state.

In order to maintain rotation speed of the input shaft I at the target rotation speed, the output torque of the driving force source increases corresponding to the increase in output shaft transfer torque.

Then, as the vehicle speed increases due to the increase in output shaft transfer torque, the shift control section 43 judges at time t36 that rotation speed of the input shaft I has become equal to or more than the direct-coupling judgment value (step #10: Yes), and starts transition control to cause the engagement-side engagement device to transition from a slip engagement state to a direct-coupled engagement state. In this embodiment, the direct-coupling judgment value is set to be higher by a predetermined value than the synchronized rotation speed after shifting at a point (at time t31) when the engagement limited downshift control is started.

Further, the shift control section 43 judges at time t36 that rotation speed of the input shaft I has become equal to or more than the direct-coupling judgment value, finishes the synchronized parallel rotation speed control, and starts torque control. Note that in the torque control, the driving force source is made to output the torque corresponding to the vehicle required torque. In the example illustrated in FIG. 7, the shift control section 43 increases the engagement pressure (instruction pressure) of the engagement-side engagement device, so as to make rotation speed of the input shaft I become close to the synchronized rotation speed after shifting. Alternatively, instead of increasing the engagement pressure (instruction pressure) of the engagement-side engagement device or along with increasing the engagement pressure (instruction pressure) of the engagement-side engagement device, the shift control section 43 may decrease the output torque of the driving force source, so as to make rotation speed of the input shaft I become close to the synchronized rotation speed after shifting.

Rotation speed of the input shaft I is controlled to be around the target rotation speed set higher by a certain rotation speed by the synchronized rotation speed after shifting by the synchronized parallel rotation speed control, and thus rotation speed of the input shaft I can be made to quickly become close to the synchronized rotation speed after shifting after the synchronized parallel rotation speed control is finished.

Then, the shift control section 43 increases the engagement pressure (instruction pressure) of the engagement-side engagement device to the complete engagement pressure when rotation speed of the input shaft I becomes close to the synchronized rotation speed after shifting, and finishes the engagement limited downshift control (engagement limited control: OFF) (at time t37).

3-4-2-1-5. Second Example of Operating Condition that the Required Driving Force is Increased and the Vehicle Speed Increases Next, a second example of operating condition that the required driving force is increased and the vehicle speed increases after the engagement limited downshift control is started will be described with reference to FIG. 8. This is an operating condition that, in the flowchart of FIG. 3, after the engagement limited downshift control is started (step #03 and thereafter), the required driving force is increased to be equal to or more than the acceleration judgment value, Yes is judged in step #12, and thereafter Yes is judged in step #10 due to increase in vehicle speed.

The period up to time t43 is the same as the period up to time t33 of FIG. 7. In the example illustrated in FIG. 7, the vehicle required torque becomes equal to or more than the acceleration judgment value (at time t35) after it is judged that rotation speed of the input shaft I has become larger than the synchronized rotation speed after shifting (at time t34 and thereafter), but in the example illustrated in FIG. 8, the vehicle required torque becomes equal to or more than the acceleration judgment value (at time t44) before it is judged that rotation speed of the input shaft I has become larger than the synchronized rotation speed after shifting (at and before time t45).

The shift control section 43 is structured to cause the engagement-side engagement device to transition to a slip engagement state when both the conditions that rotation speed of the input shaft I becomes higher than the synchronized rotation speed after shifting (step #06: Yes) and that the required driving force (vehicle required torque) is equal to or more than the acceleration judgment value (step #12: Yes) are met. Thus, after the vehicle required torque becomes equal to or more than the acceleration judgment value (at time t44 and thereafter), changing the engagement-side engagement device to a slip engagement state is prohibited until time t45 at which rotation speed of the input shaft I becomes higher than the synchronized rotation speed after shifting. Then, when the shift control section 43 judges that rotation speed of the input shaft I has become higher than the synchronized rotation speed after shifting (time t45), the shift control section 43 starts transition control to cause the engagement-side engagement device to transition from a release state to a slip engagement state.

After rotation speed of the input shaft I becomes higher than the synchronized rotation speed after shifting, positive torque can be transmitted from the input shaft I side to the output shaft O side by controlling the engagement-side engagement device to be in a slip engagement state. Note that unlike this embodiment, when the engagement-side engagement device is controlled to be in a slip engagement state before rotation speed of the input shaft I becomes higher than the synchronized rotation speed after shifting, negative torque is transmitted from the input shaft I side to the output shaft O side, torque inverted in positive/negative with respect to the vehicle required torque is transmitted to the output shaft O side, and a torque shock occurs.

Control after the transition control of the engagement-side engagement device to a slip engagement state is started is similar to the example of FIG. 7, and thus the description thereof is omitted.

3-4-2-1-6. Operating Condition that the Required Driving Force is not Increased and the Vehicle Speed Increases Next, an operating condition that after the engagement limited downshift control is started, the required driving force is not increased but the vehicle speed increases due to a downhill or the like will be described with reference to an example illustrated in FIG. 9. This is an operating condition that, in the flowchart of FIG. 3, after the engagement limited downshift control is started (step #03 and thereafter), Yes is judged in step #10 due to increase in vehicle speed.

The period up to time t54 is the same as the period up to time t14 of FIG. 5. In the example illustrated in FIG. 9, after rotation speed of the input shaft I is judged to be larger than the synchronized rotation speed after shifting (at time t54 and thereafter), the road where the vehicle is traveling is a downhill or the like and the vehicle speed starts to increase at time t55. In the example illustrated in FIG. 9, unlike the examples illustrated in FIG. 7 and FIG. 8, the vehicle required torque is less than the acceleration judgment value (step #12: No), and thus the engagement-side engagement device is maintained in a release state.

Then, as the vehicle speed increases due to the downhill or the like, the shift control section 43 judges that rotation speed of the input shaft I has become equal to or more than the direct-coupling judgment value at time t56 (step #10: Yes), and starts transition control to cause the engagement-side engagement device to transition from a release state to a direct-coupled engagement state. In this embodiment, the direct-coupling judgment value is set to be higher by a predetermined value than the synchronized rotation speed after shifting at a point (time t51) when the engagement limited downshift control is started, similarly to the examples illustrated in FIG. 7 and FIG. 8.

Figure 8:
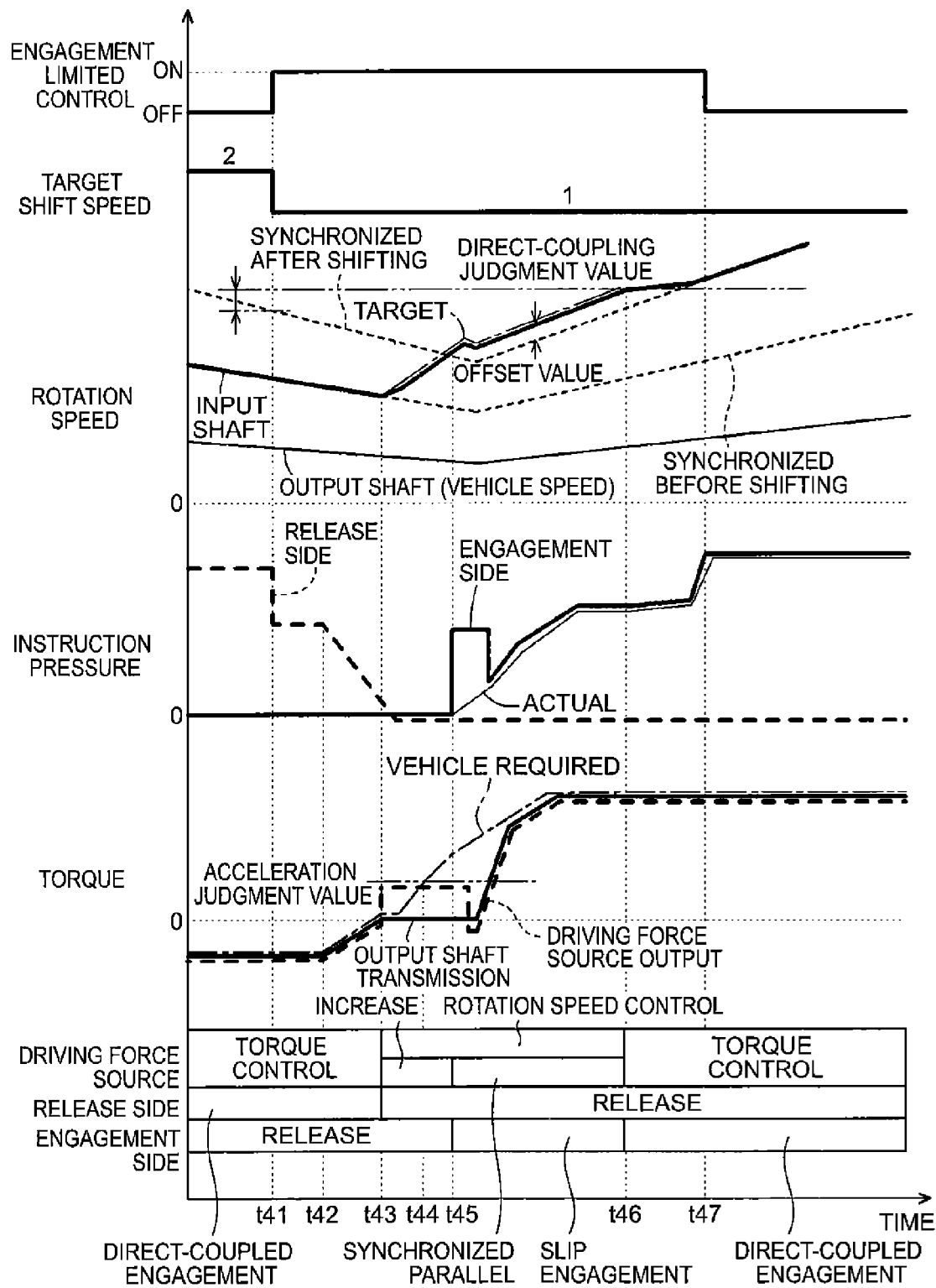
FIG. 8 is a timing chart for explaining processing of the engagement limited downshift control according to the embodiment of the present invention.

Further, the shift control section 43 judges that rotation speed of the input shaft I has become equal to or more than the direct-coupling judgment value at time t56 similarly to the examples illustrated in FIG. 7 and FIG. 8, finishes the synchronized parallel rotation speed control, and starts torque control. The shift control section 43 decreases the output torque of the driving force source to make rotation speed of the input shaft I become close to the synchronized rotation speed after shifting.

Figure 9:
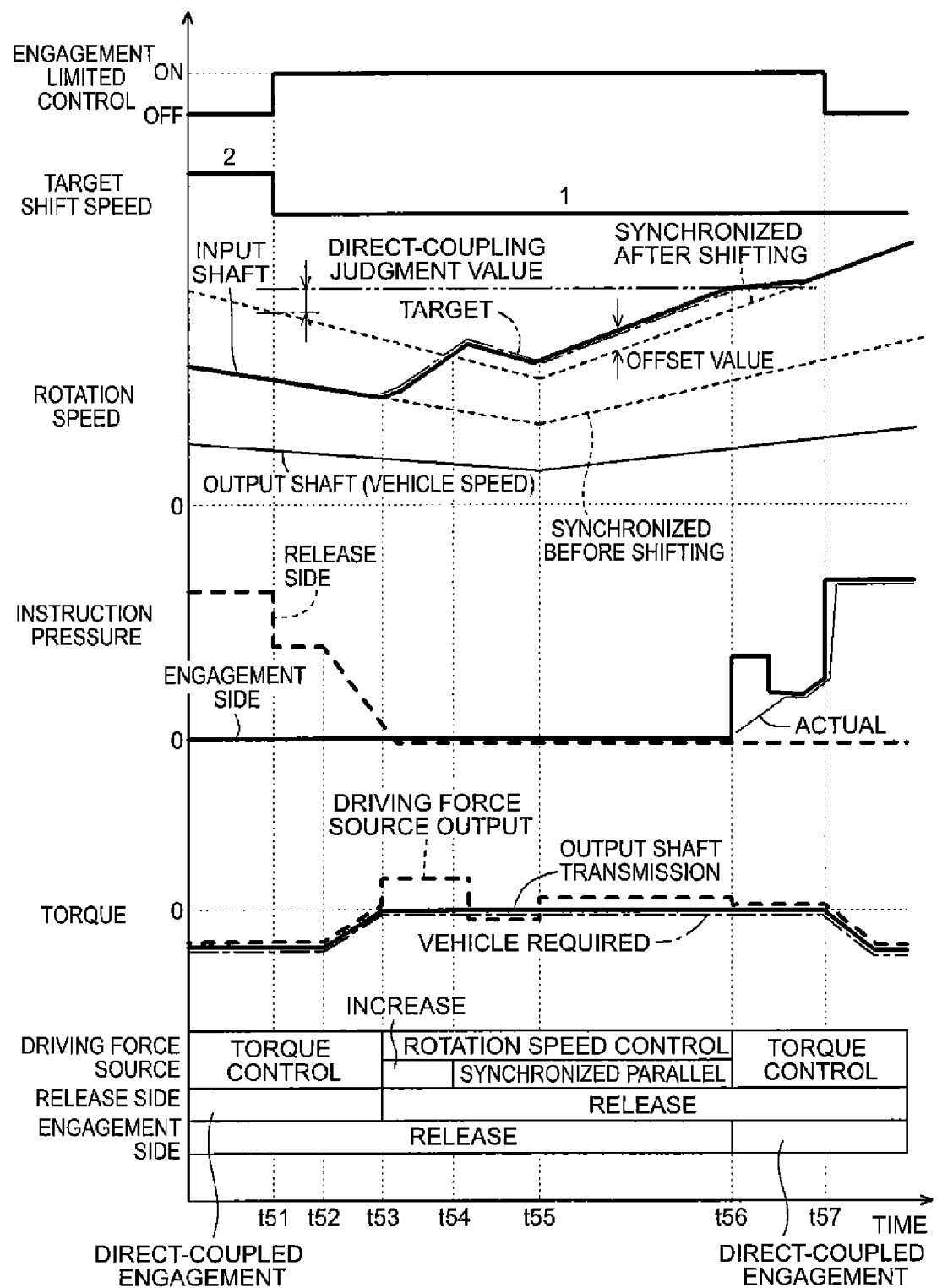
FIG. 9 is a timing chart for explaining processing of the engagement limited downshift control according to the embodiment of the present invention.

In the example illustrated in FIG. 9, after the transition control is started, the instruction pressure is set temporarily high so as to accelerate charging of hydraulic oil to the hydraulic cylinder. Then, the shift control section 43 increases the engagement pressure (instruction pressure) of the engagement-side engagement device to the complete engagement pressure when rotation speed of the input shaft I became close to the synchronized rotation speed after shifting, and finishes the engagement limited downshift control (engagement limited control: OFF) (at time t57).

OTHER EMBODIMENTS

At last, other embodiments of the present invention will be described. Note that structures of the embodiments which will be described below are not limited to ones applied independently, and can be applied in combination with structures of other embodiments unless any contradiction occurs.

Figure 11:
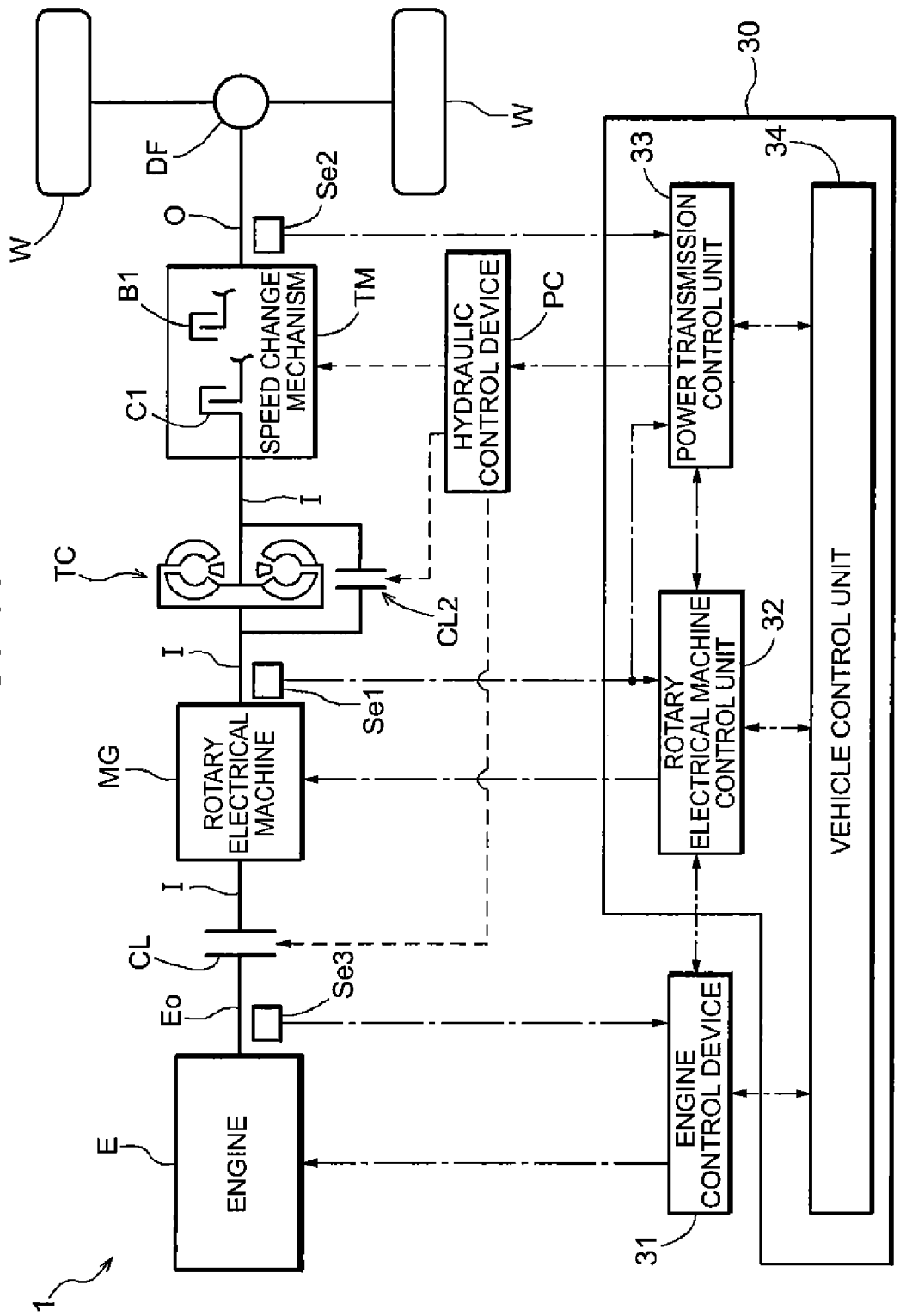
FIG. 11 is a schematic diagram illustrating a schematic structure of a vehicle driving apparatus and a control device according to another embodiment of the present invention.

(1) In the above-described embodiment, an example is described in which the speed change mechanism TM is provided between the rotary electrical machine MG and the output shaft O. However, embodiments of the present invention are not limited to this. Specifically, as illustrated in FIG. 11, the vehicle driving apparatus 1 may be structured to further include a torque converter TC and a lockup clutch CL2 which causes input and output members of the torque converter TC to be in a direct-coupled engagement state, between the rotary electrical machine MG and the speed change mechanism TM.

Figure 12:
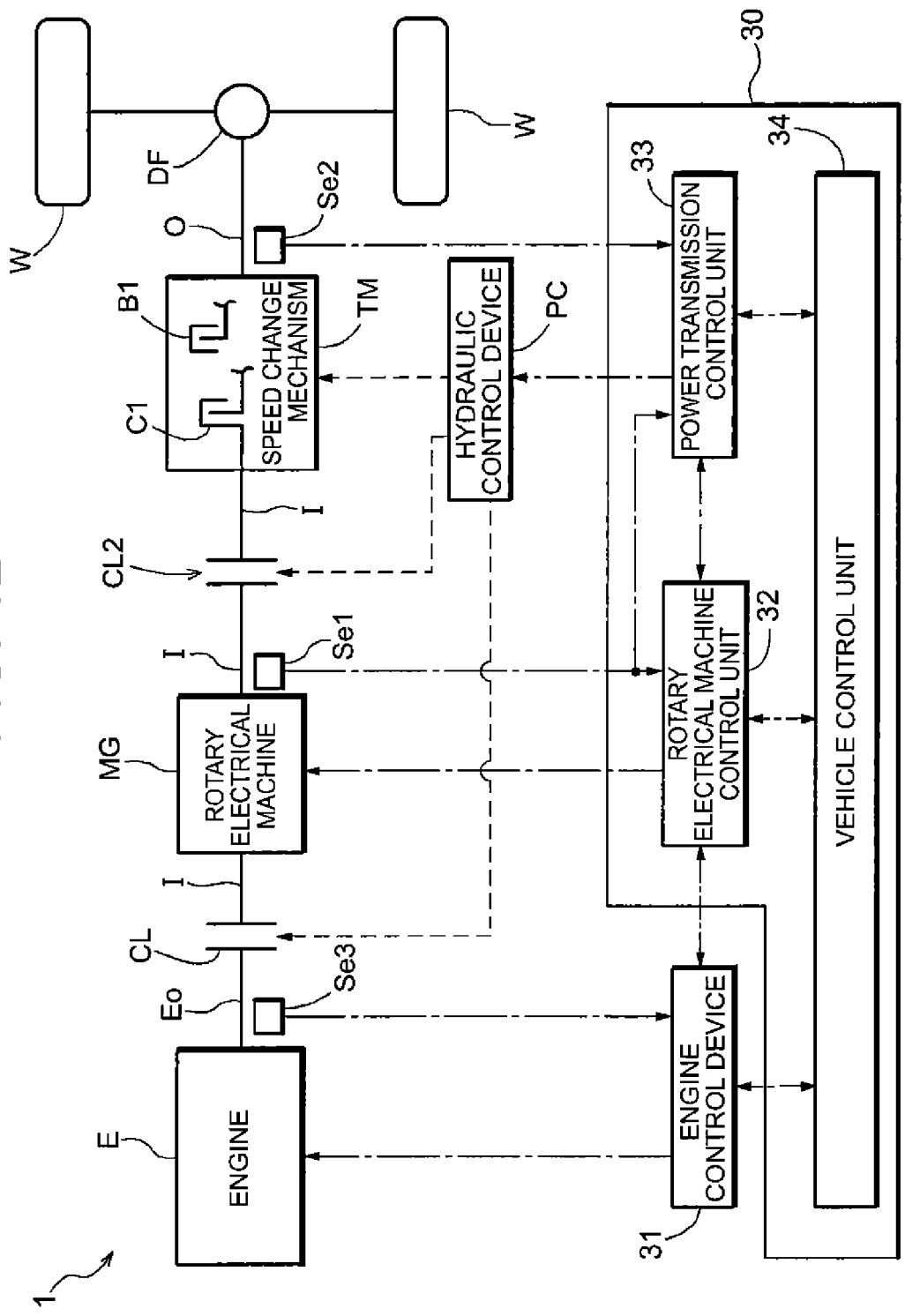
FIG. 12 is a schematic diagram illustrating a schematic structure of a vehicle driving apparatus and a control device according to another embodiment of the present invention.

Alternatively, as illustrated in FIG. 12, the vehicle driving apparatus 1 may be structured to further include an engagement device CL2 between the rotary electrical machine MG and the speed change mechanism TM.

(2) In the above-described embodiment, an example is described in which the engagement devices B1, C1, . . . , of the speed change mechanism TM are engagement devices controlled by hydraulic pressures. However, embodiments of the present invention are not limited to this. Specifically, the engagement devices B1, C1, . . . , of the speed change mechanism TM may be engagement devices controlled by a driving force other than hydraulic pressures such as, for example, a driving force of electromagnet and a driving force of servo motor.

(3) In the above-described embodiment, an example is described in which the control device 30 includes a plurality of control units 32 to 34, and the plurality of control units 32 to 34 include a plurality of functional units 41 to 44 in a sharing manner. However, embodiments of the present invention are not limited to this. Specifically, the control device 30 may include the above-described plurality of control units 32 to 34 as control devices integrated in any combination or separated, and the shares of the plurality of functional units 41 to 44 may be set appropriately.

(4) In the above-described embodiment, an example is described in which the shift control section 43 increases the instruction pressure for the engagement-side engagement device from zero after transition control to cause the engagement-side engagement device to transition from a release state to a slip engagement state or direct-coupled engagement state is started. However, embodiments of the present invention are not limited to this. Specifically, until rotation speed of the input shaft I becomes higher than the synchronized rotation speed after shifting, the shift control section 43 may prohibit engagement of the engagement-side engagement device by prohibiting issuing an instruction to cause the transfer torque capacity in the engagement-side engagement device. For example, the shift control section 43 may be structured such that, after the engagement limited downshift control is started, control to supply a low preliminary hydraulic pressure to the extent that does not cause the transfer torque capacity in the engagement-side engagement device is executed in advance before rotation speed of the input shaft I becomes higher than the synchronized rotation speed after shifting, and after rotation speed of the input shaft I became higher than the synchronized rotation speed after shifting, the hydraulic pressure is increased from the preliminary hydraulic pressure to a hydraulic pressure that causes the transfer torque capacity when the engagement-side engagement device is caused to transition to a slip engagement state or direct-coupled engagement state. Note that the control to supply the low preliminary hydraulic pressure to the extent that does not cause the transfer torque capacity is not included in engagement of the engagement device, and the control to increase from the preliminary hydraulic pressure to a hydraulic pressure that causes the transfer torque capacity is included in engagement of the engagement device.

Figure 10:
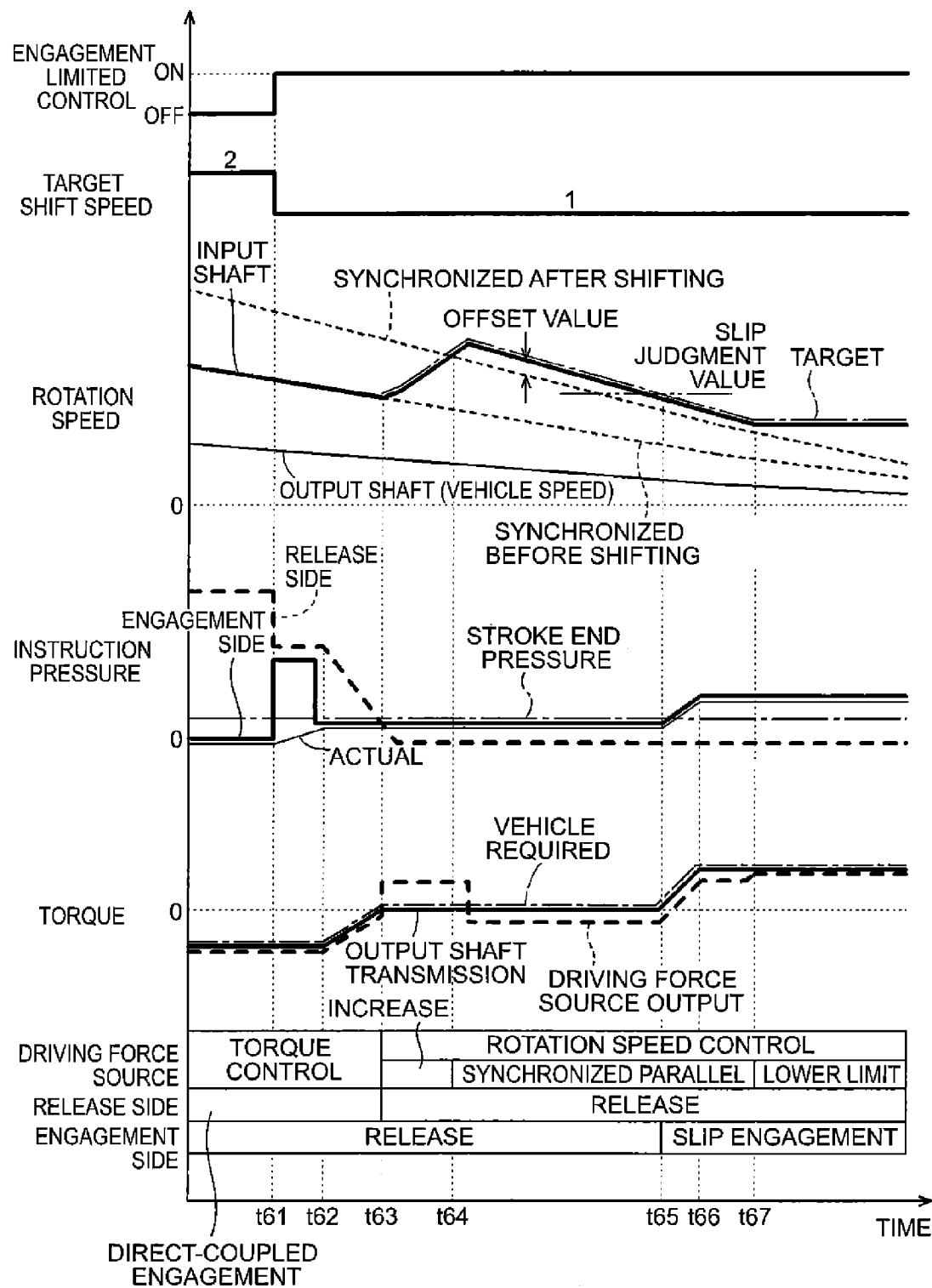
FIG. 10 is a timing chart for explaining processing of the engagement limited downshift control according to another embodiment of the present invention.

For example, as in an example illustrated in FIG. 10, the shift control section 43 may be structured such that, after the engagement limited downshift control is started (at time t61), the instruction pressure of the engagement-side engagement device is increased in advance to a preliminary pressure set lower than the stroke end pressure, and after rotation speed of the input shaft I becomes higher than the synchronized rotation speed after shifting (at time t64 and thereafter), the instruction pressure is increased from the preliminary pressure when the engagement-side engagement device is caused to transition from a release state to a slip engagement state.

(5) In the above-described embodiment, an example is described in which the shift control section 43 sets the target rotation speed in the synchronized parallel rotation speed control higher by a certain rotation speed than the synchronized rotation speed after shifting. However, embodiments of the present invention are not limited to this. Specifically, the shift control section 43 may just set the target rotation speed in the synchronized parallel rotation speed control higher than the synchronized rotation speed after shifting, and hence may be structured such that the rotation speed difference between the synchronized rotation speed after shifting and the target rotation speed changes non-constantly. Also in such a structure, rotation speed of the input shaft I becomes higher than the synchronized rotation speed after shifting, and thus positive torque can be transmitted from the input shaft I side to the output shaft O side when the engagement-side engagement device is engaged.

(6) In the above-described embodiment, an example is described in which the shift control section 43 causes the engagement-side engagement device to transition to a slip engagement state when both the conditions that rotation speed of the input shaft I becomes higher than the synchronized rotation speed after shifting and that the required driving force is equal to or more than the acceleration judgment value, which is set equal to or higher than the control judgment value, are met. However, embodiments of the present invention are not limited to this. Specifically, the shift control section 43 may be structured to cause the engagement-side engagement device to transition to a direct-coupled engagement state when both the conditions that rotation speed of the input shaft I becomes higher than the synchronized rotation speed after shifting and that the required driving force is equal to or more than the acceleration judgment value, which is set equal to or higher than the control judgment value, are met. In this case, in the flowchart of FIG. 3, when it is judged that the required driving force became equal to or more than the acceleration judgment value in step 12 (step #12: Yes), the flow proceeds to step #15 instead of step #13, thereby determining to cause the engagement-side engagement device to transition to a direct-coupled engagement state.

INDUSTRIAL APPLICABILITY

The present invention can be used preferably as a control device for controlling a vehicle driving apparatus including an input member drive-coupled to a driving force source, an output member drive-coupled to wheels, and a speed change mechanism which changes rotation speed of the input member according to a speed ratio of a shift speed formed by releasing or engaging a plurality of engagement devices among a plurality of shift speeds having different speed ratios and transmits the changed rotation speed to the output member.

DESCRIPTION OF THE REFERENCE NUMERALS

1: vehicle driving apparatus
30: control device
31: engine control device
32: rotary electrical machine control unit
33: power transmission control unit
34: vehicle control unit
40: engine control section
41: vehicle control section
42: rotary electrical machine control section
43: shift control section
44: engine disconnecting clutch control section
AP: accelerator pedal
CL: engine disconnecting clutch
E: engine (internal combustion engine)
I: input shaft (input member)
O: output shaft (output member)
MG: rotary electrical machine
PC: hydraulic control device
Se1: input rotation speed sensor
Se2: output rotation speed sensor
Se3: engine rotation speed sensor
Se4: accelerator operation amount detecting sensor
TM: speed change mechanism
W: wheel

The invention claimed is:

1. A control device for controlling a vehicle driving apparatus comprising an input member drive-coupled to a driving force source, an output member drive-coupled to a plurality of wheels, and a speed change mechanism which changes rotation speed from the input member according to a speed ratio of a shift speed formed by releasing or engaging a plurality of engagement devices among a plurality of shift speeds having different speed ratios and transmits the changed rotation speed to the output member, the control device comprising:

a shift control section which, when a target shift speed, from among the plurality of shift speeds, is determined according to a required driving force for the wheels and a vehicle speed, becomes different from a current shift speed, releases a release-side engagement device which is at least one of the engagement devices forming the current shift speed, and engages an engagement-side engagement device which is at least one of the engagement devices forming the target shift speed, thereby making the speed change mechanism form the target shift speed, wherein when a shift speed, from among the plurality of shift speeds, is larger in speed ratio than the current shift speed is determined as the target shift speed in a state where the required driving force is equal to or less than a predetermined control judgment value, the shift control section judges that an implementing condition of engagement limited downshift control is met, starts transition control to cause the release-side engagement device to transition from a direct-coupled engagement state to a non-direct-coupled engagement state and, after the release-side engagement device transitions to a non-direct-coupled engagement state, starts increasing rotation speed control to control output torque of the driving force source so that rotation speed of the input member becomes higher than a synchronized rotation speed, which is rotation speed of the input member when the target shift speed is formed in the speed change mechanism, and after rotation speed of the input member becomes higher than the synchronized rotation speed, the shift control section starts a differential rotation speed control to control output torque of the driving force source so that rotation speed of the input member becomes close to a target rotation speed set higher than the synchronized rotation speed, and prohibits engagement of the engagement-side engagement device at least until rotation speed of the input member becomes higher than the synchronized rotation speed.

2. The control device according to claim 1, wherein when both conditions: (i) that rotation speed of the input member becomes higher than the synchronized rotation speed and (ii) that the required driving force is equal to or more than an acceleration judgment value, which is set equal to or higher than the control judgment value, are met, the shift control section makes the engagement-side engagement device transition to a slip engagement state.

3. The control device according to claim 1, wherein when rotation speed of the input member or the synchronized rotation speed becomes equal to or more than a predetermined direct-coupling judgment value, the shift control section starts a transition control to cause the engagement-side engagement device to transition to a direct-coupled engagement state.

4. The control device according to claim 1, wherein when rotation speed of the input member or the synchronized rotation speed becomes equal to or less than a predetermined slip judgment value after rotation speed of the input member becomes higher than the synchronized rotation speed, the shift control section starts a transition control to cause the engagement-side engagement device to transition to a slip engagement state.

5. The control device according to claim 1, wherein at least an internal combustion engine is provided as the driving force source; and
when the internal combustion engine is in an operating state and rotation speed of the input member or the synchronized rotation speed becomes equal to or less than a predetermined lower limit rotation speed, the shift control section starts a lower limit rotation speed control to control output torque of the driving force source so that rotation speed of the input member becomes close to a predetermined target rotation speed.

* * * * *